United States Patent [19]

Harada et al.

[11] Patent Number: 4,721,018
[45] Date of Patent: Jan. 26, 1988

[54] TRANSMISSION CONTROL HAVING A PLURALITY OF SPEED CHANGING RATIOS FOR CONTROLLING A TRANSMISSION SYSTEM

[75] Inventors: Yoshiharu Harada, Toyota; Yutaka Taga, Aichi; Seiichi Nishikawa, Toyokawa; Yoichi Hayakawa, Toyoake; Masao Kawai, Chiryu, all of Japan

[73] Assignees: Toyota Jidosha Kabushiki Kaisha; Aisin-Warner Kabushiki Kaisha, both of Aichi, Japan

[21] Appl. No.: 820,178

[22] Filed: Jan. 21, 1986

[30] Foreign Application Priority Data

Jan. 19, 1985 [JP] Japan ................. 60-007768

[51] Int. Cl.$^4$ ............... B60K 41/18; F16H 37/00
[52] U.S. Cl. .................... 74/866; 180/247; 74/740; 74/867
[58] Field of Search ............. 74/869, 868, 867, 866, 74/740; 180/247

[56] References Cited

U.S. PATENT DOCUMENTS

| | | | |
|---|---|---|---|
| 3,882,740 | 5/1975 | Forster et al. | 74/866 |
| 3,943,799 | 3/1976 | Sakai et al. | 74/866 |
| 4,038,889 | 8/1977 | Lindow et al. | 74/866 |
| 4,274,306 | 6/1981 | Yokoi et al. | 74/866 |
| 4,411,174 | 10/1983 | Yokoi et al. | 74/866 |
| 4,444,073 | 4/1984 | Moroto et al. | 74/740 X |
| 4,466,502 | 8/1984 | Sakai | 180/247 |
| 4,503,927 | 3/1985 | Hayakawa et al. | 180/247 |
| 4,582,159 | 4/1986 | Suzuki | 180/247 |
| 4,586,583 | 5/1986 | Yamakawa et al. | 180/247 |
| 4,602,696 | 7/1986 | Taga et al. | 180/247 |

Primary Examiner—Leslie Braun
Assistant Examiner—Dirk Wright
Attorney, Agent, or Firm—Wegner & Bretschneider

[57] ABSTRACT

A transmission control device for controlling the operation of a transmission system including a main transmission and a sub transmission comprises a control circuit adapted for effecting a change-over of the main transmission between different speed gears in accordance with the level of the torque output from an engine when speed modes of the sub transmission are changed over. It is therefore possible to allow the main transmission to select a gear conformable to the gear ratio set in the sub transmission in accordance with the engine output torque, whereby it is possible to obtain optimum shifting characteristics. In addition, it is possible to widen the shiftable region for the sub transmission.

12 Claims, 15 Drawing Figures

TRANSMISSION CONTROL HAVING A PLURALITY OF SPEED CHANGING RATIOS FOR CONTROLLING A TRANSMISSION SYSTEM

BACKGROUND OF THE INVENTION

The present invention relates to a transmission control device for controlling the operation of a transmission system which includes a main transmission and a sub transmission.

One type of conventional transmission system is constituted by a combination of a main transmission and a sub transmission which enables different speed modes to be selectively changed over. This type of transmission system is composed mainly of a hydraulic controller which operates in accordance with various factors, e.g., the hydraulic pressure (governor pressure) corresponding to the vehicle running speed, throttle opening of the engine and so forth; a main transmission having a plurality of different speed gears and controlled by the hydraulic controller; and a sub transmission which has an input shaft constituted by the output shaft of the main transmission and which enables change-over between different speed modes, i.e., direct-coupling mode and reduced-speed mode. In this type of transmission system, even when the speed mode of the sub transmission is changed over from the direct-coupling mode to the reduced-speed mode, or vice versa, the gear change operation of the main transmission is effected in accordance with the state of running of the vehicle, e.g., vehicle running speed, throttle opening of the engine and so forth, regardless of the speed mode set in the sub transmission.

For this reason, the conventional transmission system of the type described above suffers from the following disadvantages. Namely, when the vehicle running state is within the shiftable region for the sub transmission (i.e., when the governor pressure is less than a set value) and the torque input to the sub transmission is excessively large, a considerably large change in torque occurs when a change-over of the sub transmission between different speed modes takes place, so that it is not possible to obtain satisfactory shifting characteristics. Further, since a governor valve for producing a governor pressure is provided on the output shaft of the main transmission for the purpose of controlling the speed change operation of the main transmission, when the vehicle running state is out of the shiftable region for the sub transmission (i.e., when the governor pressure is greater than a set value), any speed mode change in the sub transmission is inhibited, which fact limits the shiftable region for the sub transmission to a disadvantageously narrow range.

SUMMARY OF THE INVENTION

In view of the above-mentioned circumstances, it is an object of the present invention to provide a transmission control device for controlling the operation of a transmission system which includes a main transmission and a sub transmission, the device enabling optimum shifting characteristics to be obtained by properly reducing the torque input to the sub transmission.

It is another object of the present invention to provide a transmission control device which enables the shiftable region for the sub transmission to be widened.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

To the above-mentioned ends, the present invention provides a transmission control device for controlling the operation of a transmission system which includes a main transmission and a sub transmission, the device comprising a control means adapted for effecting a change-over of the main transmission between different speed gears in accordance with the level of the torque output from an engine when speed modes of the sub transmission are changed over.

Accordingly, it is possible to allow the main transmission to select a gear conformable to the gear ratio set in the sub transmission in accordance with the engine output torque, whereby it is possible to obtain optimum shifting characteristics. In addition, it is possible to widen the shiftable region for the sub transmission.

BRIEF DESCRIPTION OF THE DRAWINGS

For a fuller understanding of the invention, reference is had to the following description taken in conjunction with the accompanying drawings, in which.

DESCRIPTION OF THE PREFERRED EMBODIMENTS

The transmission control device of the invention will be fully understood from the following description of a preferred embodiment when the same is read in conjunction with the accompanying drawings.

Figure 1:
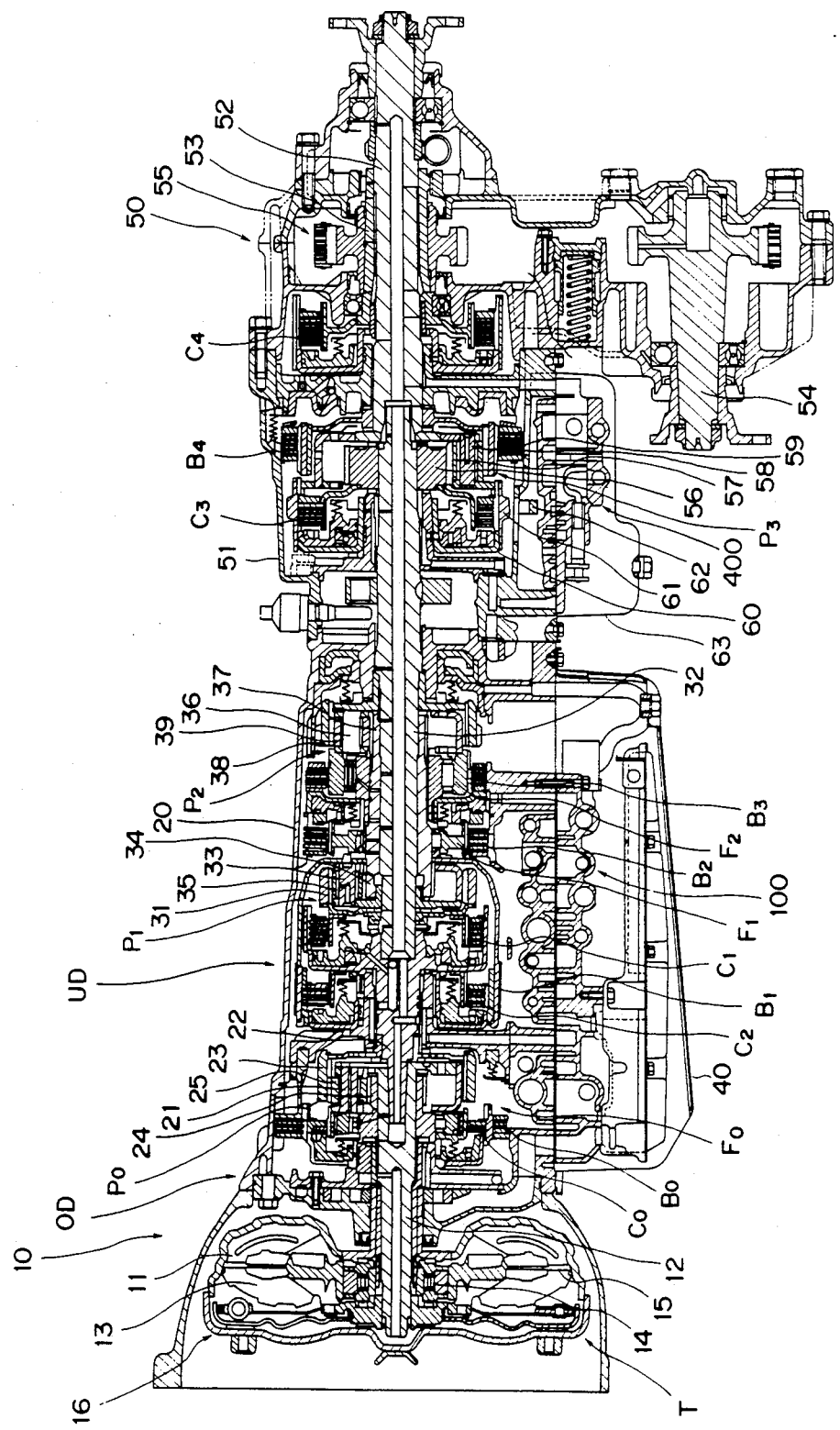
FIG. 1 is a sectional view of a four-wheel drive transmission system.
Figure 2:
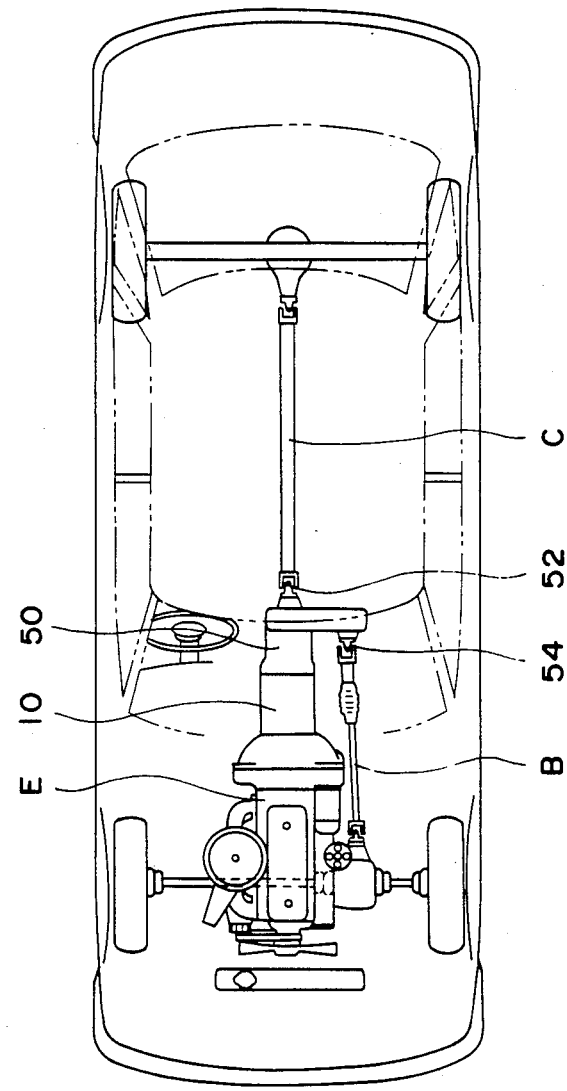
FIG. 2 schematically shows a drive mechanism for a four-wheel drive vehicle.

FIG. 1 is a sectional view of a transmission system to which the present invention is applied, the transmission system being composed mainly of a four-speed automatic transmission having four forward speed gears and one reverse gear, and a four-wheel drive sub transmission. FIG. 2 schematically shows a four-wheel drive vehicle in which is mounted the transmission system shown in FIG. 1.

Referring first to FIG. 1, the transmission system includes a main transmission 10 which is a four-speed automatic transmission with an overdrive, and a four-wheel drive sub transmission 50 which is coupled to the output side of a planetary gear system incorporated in the main transmission 10. The main transmission 10 is directly mounted on an engine E and has an output shaft 32 which constitutes an input shaft of the four-wheel drive sub transmission 50. The sub transmission 50 has two output shafts: namely, a first output shaft 52 coupled to a rear-wheel drive propeller shaft C and a second output shaft 54 coupled to a front-wheel drive propeller shaft B.

The main transmission 10 is constituted by a fluid type torque converter T, an overdrive mechanism OD and an underdrive mechanism UD having three forward speed gears and one reverse gear.

The torque converter T has a pump impeller 11 coupled to the output shaft of the engine E, a turbine impeller 13 coupled to the output shaft 12 of the torque converter T, a stator 15 connected to a stationary part through a one-way clutch 14, and a direct clutch 16. The output shaft 12 of the converter T serves as the input shaft of the overdrive mechanism OD.

The overdrive mechanism OD includes frictional engagement means such as a multi-disc clutch C0, multi-disk brake B0 and a one-way clutch F0, and a planetary gear device P0. The planetary gear device P0 has various constituent parts which are brought into and out of engagement with other parts such as a stationary part, e.g., a main transmission case 20, input shaft, output shaft and other parts, in accordance with the respective states of selective engagement of the above-mentioned frictional engagement means.

More specifically, the planetary gear device P0 has a carrier 21 connected to the output shaft 12, a ring gear 23 connected to the output shaft 22 of the overdrive mechanism OD, a sun gear 24 rotatably carried by the output shaft 12 and fixed to the main transmission case 20 through the brake B0, the sun gear 24 being connected to the carrier 21 through the clutch C0 and also through the one-way clutch F0 parallel to the clutch C0 and planetary pinions 25 rotatably carried by the carrier 21 and held in meshing engagement with the sun gear 24 and the ring gear 23.

The output shaft 22 of the overdrive mechanism OD serves as the input shaft of the underdrive mechanism UD which has three forward speed gears and one reverse gear.

The underdrive mechanism UD has frictional engagement means such as multi-disc clutches C1 and C2, a belt brake B1, multi-disc brakes B2 and B3, one-way clutches F1 and F2, a primary planetary gear device P1 and a secondary planetary gear device P2.

The primary planetary gear device P1 includes a ring gear 31 connected to the output shaft 22 through the clutch C1, a carrier 33 connected to the output shaft 32 of the underdrive mechanism UD, a sun gear 34 connected to the output shaft 22 through the clutch C2 and fixed to the main transmission case 20 through the belt brake B1 and also through a series connection of the one-way clutch F1 and the brake B2 which is parallel to the brake B1 and planetary pinions 35 rotatably carried by the carrier 33 and held in meshing engagement with the sun gear 34 and the ring gear 31.

The secondary planetary gear device P2 includes a carrier 36 which is fixed to the main transmission case 20 through the brake B3 and also through the one-way clutch F2 parallel to the brake B3, a sun gear 37 formed integrally with the sun gear 34 of the primary planetary gear device P1, a ring gear 38 connected to the output shaft 32, and planetary pinions 39 rotatably carried by the carrier 36 and held in meshing engagement with the sun gear 37 and the ring gear 38.

A main hydraulic controller 100 is accommodated by an oil pan 40 connected to the underside of the main transmission case 20 and is provided at the underside thereof with an oil strainer 101. The main hydraulic controller 100 operates in accordance with various factors representing the state of running of the vehicle, e.g., throttle opening of the engine E, vehicle running speed and so forth, so as to selectively engage and disengage the clutches and brakes, thereby effecting gear change over four forward speed gears including the overdrive O/D and the reverse gear which is selected manually.

The sub transmission 50 has a sub transmission case 51 which is coupled to the rear end of the main transmission case 20 by means of a plurality of bolts, such that the output shaft 32 of the main transmission 10 constitutes the input shaft of the sub transmission 50. More specifically, the sub transmission 50 has frictional engagement means such as a clutch C3, a brake B4 and a clutch C4 which are driven by the input shaft constituted by the common output shaft of the planetary gear devices P1 and P2. The sub transmission 50 has a first output shaft 52 connected in series to the output shaft 32, a planetary gear device P3 interposed between the output shaft 32 and the first output shaft 52, a four-wheel drive sleeve 53 rotatably fitted around the first output shaft 52, a second output shaft 54 disposed in parallel with the output shaft 32 and projecting in the direction opposite to the first output shaft 52, and a transfer mechanism 55 through which the sleeve 53 is connected to the second output shaft 54. The planetary gear device P3 includes a sun gear 56 splined to the end of the output shaft 32, planetary pinions 57 meshing with the sun gear 56, a ring gear 58 meshing with the planetary pinions 57, and a carrier 59 rotatably carrying the planetary pinions 57 and connected to the free end of the first output shaft 52 of the sub transmission 50. A parking gear 61 is formed on the outer peripheral surface of a cylinder 60 which is connected to the carrier 59. The arrangement is such that, when a shift lever (not shown) of the main transmission 10 is operated to select a parking position, a stopper 62 engages with the parking gear 61 thereby fixing the first output shaft 52.

The frictional engagement means, i.e., clutches and brakes, of the sub transmission 50 are selectively operated to be engaged and disengaged by a sub hydraulic controller 400 which is disposed in an oil pan 63 under the sub transmission case 51.

Figure 3:
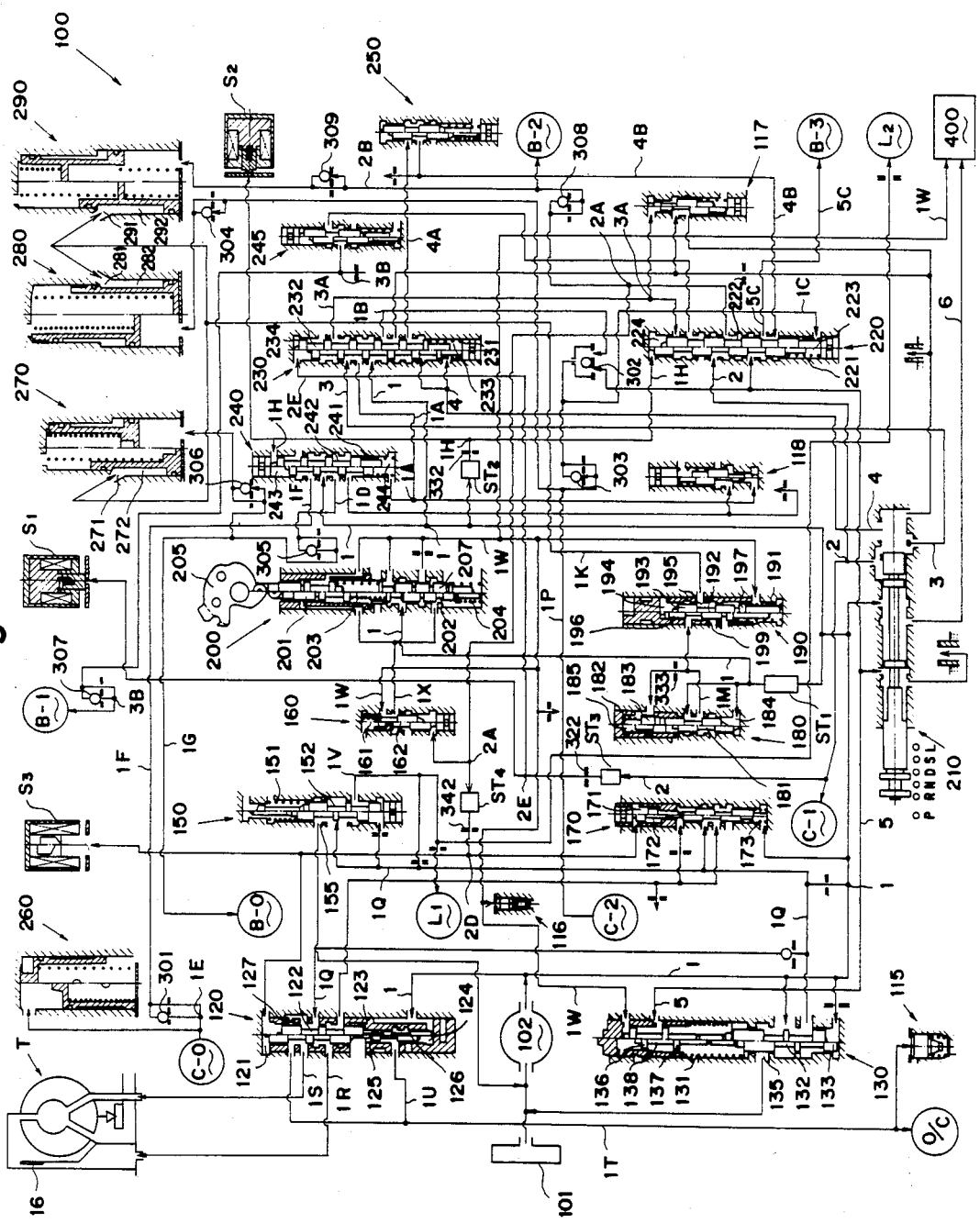
FIG. 3 is a hydraulic circuit diagram of a main hydraulic controller for controlling a main transmission.

FIG. 3 shows the detail of the main hydraulic controller 100 for controlling the main transmission 10.

As will be seen from this Figure, the main hydraulic controller 100 has the following parts: an oil strainer 101; an oil pump 102; a cooler by-pass valve 115 for regulating the oil pressure in an oil cooler O/C; a pressure relief valve 116; a release clutch control valve 117; a release brake control valve 118; a lock-up relay valve 120; a pressure regulator valve 130 for regulating the pressure of a working fluid or oil which is supplied by the oil pump 102 to an oil passage 1; a second pressure regulator valve 150 through which the oil is supplied both to a lubricating oil supply passage L1 leading to the main transmission 10 and a working oil supply passage L2 for the sub transmission 50; a cut-back valve 160; a lock-up control valve 170; a first accumulator control valve 180; a second accumulator control valve 190; a throttle valve 200; a manual valve 210 which distributes the line pressure in the oil passage 1 selectively to oil passages 2 to 6; a 1-2 shift valve 220; a 2-3 shift valve 230; a 3-4 shift valve 240; an intermediate coast modulator valve 245 which regulates the pressure of the oil supplied to the brake B1; a low coast modulator valve 250 for regulating the pressure of the oil supplied to the hydraulic servomotor B-3; an accumulator 260 for smoothing the engagement of the clutch C0; an accumulator 270 for smoothing the engagement of the brake B0; an accumulator 280 for smoothing the engagement of the clutch C2; an accumulator 290 for smoothing the engagement of the brake B2; hydraulic servomotors C-0, C-1 and C-2 for the clutches C0, C1 and C2; hydraulic servomotors B-0, B-1, B-2 and B-3 for the brakes B0, B1, B2 and B3; flow-rate control valves for controlling the flow rates of oil flowing therethrough, the flow-rate control valves being respectively denoted by 301, 303, 304, 305, 306, 307, 308 and 309 and provided with respective check valves; a shuttle valve 302; oil strainers ST1, ST2, ST3 and ST4; a first solenoid valve S1 adapted for controlling the 2-3 shift valve 230 under the control of a later-mentioned electronic controller or computer 600; a second solenoid valve S2 adapted for controlling both the 1-2 shift valve 220 and the 3-4 shift valve 240 under the control of the computer 600; a third solenoid valve S3 adapted to control both the lock-up relay valve 120 and the lock-up control valve 170 under the control of the computer 600; and oil passages providing communication between the valves and the hydraulic cylinders of respective clutches and brakes.

The working oil is sucked by the hydraulic pump 102 from the oil pan 40 through an oil strainer 101, and is supplied to the oil passage 1 at a predetermined line pressure regulated by the pressure regulator valve 130.

The pressure regulator valve 130 has a spool 132 which is urged by a spring 131 disposed on the upper side thereof as viewed in FIG. 3, and a plunger 138 disposed in series with and in contact with the spool 132. In operation, a throttle pressure introduced through an oil passage 1W and acting on the uppermost land 136 of the plunger 138 produces a force which, together with the force produced by the spring 131, acts to cause a downward displacement of the spool 132. When reversing, downward force is produced also by the line pressure introduced through the oil passage 5 and acting on the lowermost land 137 of the plunger 138, in addition to the downward force produced by the throttle pressure and the spring 131. On the other hand, the line pressure is fed back to the lowermost land 133 of the spool 132 so as to produce a force which acts to displace the spool 132 upwardly. In consequence, the spool 132 is displaced to a position where the upward force and the downward force balance each other, so as to change the area of communication between the oil passage 1 and the oil passage 1Q, as well as the area of communication between the oil passage 1 and the drain port 135, thereby maintaining the line pressure at a level corresponding to the state of running of the vehicle.

The throttle valve 200 has a throttle plunger 201 which is adapted to be displaced by a cam 205 which in turn is rotated in accordance with the amount by which the accelerator pedal is depressed. The throttle valve 200 also has a spool 202 disposed on the lower side of the throttle plunger 201 as viewed in FIG. 3 with a spring 203 acting as an intermediary therebetween. The stroking of the throttle plunger 201 causes an axial movement of the spool 202 through the action of the spring 203 so that the spool 202 changes the line pressure supplied from the oil passage 1 to the throttle pressure corresponding to the throttle opening and delivers the throttle pressure to the oil passage 1W.

The second pressure regulator valve 150 has a spool 152 which is urged by a spring 151 acting on the upper side thereof as viewed in FIG. 3. The spool 152 is axially displaced to a position where a balance is obtained between the downward force exerted by the spring 151 and an upward force which is generated by an oil pressure fed back through the oil passage 1Q and acting on the lower side thereof, thus varying the area of communication between the oil passage 1Q and the lubricating oil supply passage 1V, as well as the area of communication between the oil passage 1Q and the drain port 155, thereby regulating the pressure in the oil passage 1Q to a predetermined secondary line pressure (torque converter pressure), while delivering excessive oil to the oil passage 1V. The oil supplied to the oil pressure 1V is distributed both to the lubricating oil passage L1 of the main transmission 10 and the working oil supply passage L2 leading to the sub transmission 50.

The manual valve 210 is directly connected to the shift lever arranged in the vicinity of the driver's seat, and is adapted to take one of the positions P (parking), R (reverse), N (neutral), D (drive), S (second), and L (low) as the shift lever is manually operated such as to select one of the ranges P, R, N, D, S and L.

The first solenoid valve S1, when not energized, blocks the oil passage 2E which is communicated with the oil passage 2 through an orifice 322. In this state, a solenoid pressure of high level equal to that of the line pressure is maintained in the oil passage 2E. Howevewr, when energized, the first solenoid valve S1 allows the oil passage 2E to communicate with the drain, so that the solenoid pressure in the oil passage 2E is reduced to a low level.

Similarly, the second solenoid valve S2 operates, when not energized, to establish a high solenoid pressure in the oil passage 1H which communicates with the oil passage 1 through an orifice 332 and, when energized, to drain the oil in the oil passage 1H thereby reducing the solenoid pressure to a low level.

The third solenoid valve S3 controls the pressure in an oil chamber 121 which is formed on the upper side of the lock-up relay valve 120 as viewed in FIG. 3 and connected to the oil passage 2D which in turn is communicated with the oil passage 2A through an orifice 342. The third solenoid valve S3 also controls the pressure in an oil chamber 171 which is formed on the upper side of the lock-up control valve 170 as viewed in FIG. 3. More specifically, the third solenoid valve S3 operates, when energized, to establish a high solenoid pressure in the oil chambers 121 and 171 thereby displacing the spools 122 and 172 downwardly as viewed in FIG. 3, whereas, when de-energized, it allows the oil chambers 121 and 171 to be drained so as to reduce the solenoid pressure to a low level, thereby allowing the spools 122 and 172 to return to the upper positions by virtue of the force produced by the line pressure derived from the oil passage 1 and the forces of the springs 123 and 173.

The 1-2 shift valve 220 has a spool 222 which is urged by a spring 221 acting on the lower side thereof as viewed in FIG. 3. When the solenoid pressure of high level is maintained in the oil passage 1H by the second solenoid valve S2 which is not energized, this high solenoid pressure is introduced into an oil chamber 224 which is defined on the upper side of the 1-2 shift valve 220, so that the spool 222 is moved downwardly to a first speed position. Conversely, when the second solenoid valve S2 is energized to drain the oil passage 1H and thereby to reduce the solenoid pressure to the low level, the spool 222 is returned to the upper position, away from the first speed position. When a third speed or a fourth speed is selected, the line pressure is introduced into an oil chamber 223 which is formed on the lower side of the spool 222 through the oil passage 1, 2-3 shift valve 230 and then through the oil passage 1C which is communicated with the oil passage 1B, so that the spool 222 is held at the upper position regardless of the level of the solenoid pressure.

The 2-3 shift valve 230 has a spool 232 urged by a spring 231 acting on the lower side thereof, as viewed in FIG. 3. When the first solenoid valve S1 is energized, the solenoid pressure in the oil passage 2E takes the low level, so that the spool 232 is held by the force of the spring 231 at an upper position, as viewed in FIG. 3, where it serves for first and second speeds, as well as for reversing. Conversely, when the first solenoid valve S1 is not energized, high solenoid pressure established in the oil passage 2E is applied to an oil chamber 234 so as to produce a force which acts to displace the spool 232 downwardly, as viewed in FIG. 3, to a lower position where it serves for the third speed and fourth speed operations. However, when the line pressure is supplied to an oil chamber 233 which is formed on the lower side of the spool 232, the spool 232 is fixed at the upper position regardles of the level of the solenoid pressure.

The 3-4 shift valve 240 has a spool 242 which is urged by a spring 241 acting on the lower side thereof. When the second solenoid valve S2 is not energized, the solenoid pressure of the high level is introduced through the oil passage 1H into an oil chamber 243 on the upper side of the spool 242, so that the spool 242 is held at a lower position as viewed in FIG. 3 where it serves for fourth speed (overdrive) operation. In contrast, when the second solenoid valve S2 is energized, the oil passage 1H is drained so that the spool 242 is set at an upper position where it serves for operations other than that for the fourth speed. When the line pressure is fed to an oil chamber 244 defined on the lower side of the spool 242 from the oil passage 1 or the oil passage 3 via the 2-3 shift valve 230 and the oil passage 1A, the spool 242 is fixed at the upper position by the force generated by the line pressure and the force of the spring 241.

The cut-back valve 160 has a spool 162 which is displaced by a downward force exerted by a spring 161 and an upward force produced by the line pressure introduced through the oil passage 2A. More specifically, when the line pressure is supplied through the oil passage 2A, the spool 162 is set at the upper position as viewed in FIG. 3 so as to bring the oil passage 1X into communication with the oil passage 1W which maintains the throttle pressure mentioned before, thereby outputting the throttle pressure as the cut-back pressure which is applied to the lower land 207 of the spool 202 of the throttle valve 200, thereby reducing the level of the throttle pressure in the oil passage 1W. The reduction in the throttle pressure causes the spool 132 of the pressure regulator valve 130 to move upwardly, thereby allowing the line pressure in the oil passage 1 to be relieved through a drain port 135, thus effecting a so-called "cut-back" of the line pressure.

The first accumulator control valve 180 has a spool 181 disposed at a lower portion thereof as viewed in FIG. 3, and a plunger 183 connected in series to the spool 181 and downwardly urged by a spring 182. In operation, the spool 181 is axially displaced so as to attain a balance between an upward force produced by the line pressure introduced into a lower oil chamber 184 through the oil passage 1 and a downward force which is the sum of the force of the spring 182 and the force produced by the output pressure fed back from the oil passage 1M to an upper oil chamber 185 through an orifice 333, thereby producing the output pressure through regulating the line pressure which is transmitted from the oil passage 1. The thus obtained output pressure is delivered to the second accumulator control valve 190 through the oil passage 1M.

The second accumulator control valve 190 has a spool 192 which is urged by a spring 191 acting on the lower side thereof. The spool 192 has an upper land 193 in which is formed an orifice 196 which provides communication between an upper oil chamber 194 formed on the upper side of the spool 192 and an intermediate oil chamber 195 formed under the land 193. The spool 192 is axially displaced upon balance being attained between an upward force which is the sum of the force exerted by the spring 191 and the force produced by a throttle modulator pressure which acts on a lower land 197 of the spool 192 through the oil passage 1W, and a downward force which is produced by a feedback pressure from the oil passage 1M to act in the upper oil chamber 194 through the orifice 196, thereby producing an output pressure at the oil passage 1M. The output pressure from the oil passage 1M is supplied through the oil passage 1K to back-pressure chambers 272, 282 and 292 of the accumulators 270, 280 and 290 through respective back-pressure ports 271, 281 and 291, thereby controlling the back pressure in these accumulators. The back pressure in turn is applied through the oil passage 1K to the upper land 193 of the spool 192, so that the latter is displaced downwardly as viewed in FIG. 3, thereby allowing the oil passage 1K to be communicated with a drain port 199 through an intermediate oil chamber 195, whereby the back pressure in the oil passage 1K is relieved.

As stated before, the manual valve 210 is operated manually by means of the shift lever (not shown) of the main transmission 10 disposed in the vicinity of the driver's seat. The shift lever is adapted to be operated manually by the driver so as to take one of the ranges P (parking), R (reverse), N (neutral), D (drive), S (second) and L (low) of the main shift position Mp. Table 1 shows the gear stages, i.e., the fourth (4), third (3) second (2) and first (1) gears obtainable in the respective ranges of the main shift position Mp, as well as the states of clutches and brakes corresponding to the respective gear stages.

TABLE 1

| MP | S1 | S2 | S3 | C1 | C2 | C0 | B1 | B2 | B3 | B0 | F1 | F2 | F3 |
|---|---|---|---|---|---|---|---|---|---|---|---|---|---|
| P | O | X |   | X | X | X | E | X | X | X | f | f | f |
| R | O | X |   | X | X | E | E | X | X | E | X | f | f | f |

TABLE 1-continued

| MP | | S1 | S2 | S3 | C1 | C2 | C0 | B1 | B2 | B3 | B0 | F1 | F2 | F3 |
|---|---|---|---|---|---|---|---|---|---|---|---|---|---|---|
| N | | O | X | X | X | X | E | X | X | X | X | f | f | f |
| D | 1 | O | X | X | E | X | E | X | X | X | X | f | L | (L) |
|   | 2 | O | O | ◉ | E | X | E | X | E | X | X | L | f | (L) |
|   | 3 | X | O | ◉ | E | E | E | X | E | X | X | f | f | (L) |
|   | 4 | X | X | ◉ | E | E | X | X | E | X | E | f | f | f |
| S | 1 | O | X | X | E | X | E | X | X | X | X | f | L | (L) |
|   | 2 | O | O | ◉ | E | X | E | E | E | X | X | (L) | f | (L) |
|   | 3 | X | O | ◉ | E | E | E | X | E | X | X | f | f | (L) |
|   | (3) | X | X | X | E | E | E | X | E | X | X | f | f | (L) |
| L | 1 | O | X | X | E | X | E | X | X | E | X | f | (L) | (L) |
|   | 2 | O | O | X | E | X | E | E | E | X | X | (L) | f | (L) |
|   | (1) | X | X | X | E | X | E | X | X | E | X | f | (L) | (L) |

In Table 1, marks O and X represent the fact that the solenoid valves S1 and S2 are energized and de-energized, respectively, whereas the mark ◉ shows that the solenoid valve S3 is energized to lock-up the transmission. The mark X appearing in the column of the solenoid valve S3 indicates that the solenoid valve S3 is de-energized to release the lock-up state. The symbol E shows that the clutches and the brakes are engaged, while the symbol X in the columns of clutches and brakes indicate that the clutches and brakes are released. The symbol L indicates that the one-way clutch is in the engaged state when the power is transmitted from the engine even though the power transmission is ensured also by a clutch or a brake connected in parallel with this one-way clutch, i.e., it indicates that the one-way clutch is locked. The symbol (L) shows that the one-way clutch is engaged only in the engine driving condition but is disengagted in the engine braking condition. Finally, the symbol f indicates that the clutch is in the free state.

Table 2 shows that states of communication between the oil passage 1 and the oil passages 2 to 6, as obtained in the respective positions of the shift lever of the main transmission 10.

TABLE 2

| | P | R | N | D | S | L |
|---|---|---|---|---|---|---|
| Oil passage 2 | X | X | X | O | O | O |
| Oil passage 3 | X | X | X | X | O | O |
| Oil passage 4 | X | X | X | X | X | O |
| Oil passage 5 | X | O | X | X | X | X |
| Oil passage 6 | X | O | O | O | O | O |

In Table 2, a mark shows establishment of the communication that allows delivery of the line pressure to the respective oil passages, whereas a mark X indicates that the respective oil passages are drained.

The operation of the main hydraulic controller 100 in response to the manual shifting operation of the manual valve 210 will be explained hereinunder.

When Manual Valve 210 Selects N or P Range

In this state, the oil passage 1 communicates with none of the oil passages 2 to 5, as will be seen from Table 2, and the first and second solenoid valves S1 and S2 are energized and de-energized, respectively, as shown in Table 1. The spool 222 of the 1-2 shift valve 220 is therefore displaced to the lower position by the force produced by the high level solenoid pressure, while the spool 232 of the 2-3 shift valve 230 takes the upper position under the force of the spring 231, thus allowing the line pressure to be supplied from the oil passage 1A to the lower oil chamber 244 of the 3-4 shift valve 240 and thereby upwardly displacing the spool 242 of the 3-4 shift valve 240. In this state, only the servomotor C-0 of the clutch C0 is communicated with the oil passage 1 through the 3-4 shift valve 240, oil passage 1F, flow-rate control valve 301 with check valve, and the oil passage 1E, while detouring the manual valve 210, so that only the clutch C0 is engaged.

When Manual Valve 210 Selects D Range

In this state, the line pressure is supplied to the oil passage 2, so that the clutch C1 is engaged.

The vehicle then starts with the first speed gear. Namely, when the D range is selected, the first solenoid valve S1 and the second solenoid valve S2 are energized and de-energized, respectively, as shown in Table 2, so that the spool 222 of the 1-2 shift valve 220 takes the lower position. In this state, the oil passages 3B and 2A leading to the brakes B1 and B2 are drained, and the oil passage 5C leading to the brake B3 is not supplied with oil, so that the brakes B1, B2 and B3 are released. At the same time, since the spool 232 of the 2-3 shift valve 230 is set at the upper position, the oil passage 1B is drained and the clutch C0 thereby disengaged. Meanwhile, the line pressure is supplied from the oil passage 1A to the lower oil chamber 244 of the 3-4 shift valve 240, so that the spool 242 is held at the upper position such as to maintain the clutch C0 in the engaged state by the oil pressure which is supplied from the oil passage 1 through the 3-4 shift valve 240 and the oil passage 1F. On the other hand, the oil passage 1B is drained so that the clutch C2 is disengaged and the brake B0 is released because the oil passage 1D is drained as a result of the supply of the line pressure to the oil passage 1F. In consequence, the power train is completed with the first speed gear, thereby starting the vehicle with the first speed gear.

Up-shift to the second speed gear is conducted in accordance with the state of running of the vehicle, in a manner which will be explained hereinunder.

When the vehicle running speed has reached a predetermined level, the computer 600 produces an output which allows the second solenoid valve S2 to be energized, so that the solenoid pressure acting in the upper oil chamber 244 of the 1-2 shift valve 220 is reduced to the low level, thereby causing the spool 222 of the 1-2 shift valve 220 to be moved upward, whereby the oil is supplied to the servomotor B-2 of the brake B2 from the oil passage 2, 1-2 shift valve 220, oil passage 2A, flow-rate control valve 308 with check valve, and the oil passage 2B, thus engaging the brake B2 and accomplishing the up-shift to the second speed gear.

As the vehicle speed is further increased, an up-shift to the third speed gear is effected in the following way. Namely, the computer 600 produces an output which serves to de-energize the first solenoid valve S1, so that the spool 232 of the 2-3 shift valve 230 is moved downwardly, thereby engaging the clutch C2 by the oil pressure which is supplied from the oil passage 1 through the 2-3 shift valve 230, oil passage 1B, shuttle valve 302, flow-rate control valve 303 with check valve and the oil passage 1P. Meanwhile, the line pressure is supplied from the oil passage 1C to the lower oil chamber 223 so as to fix the spool 222 of the 1-2 shift valve 220 at the upper position where it serves for speed other than the first speed.

For up-shifting to the fourth speed gear, the computer 600 produces an output which serves to de-energize the second solenoid valve S2 so that the solenoid pressure which has been supplied from the oil passage 1H to the upper oil chamber 243 of the 3-4 shift valve 240 is returned to the high level, thus allowing the spool 242 of the 3-4 shift valve 240 to be moved downwardly. As a result, the oil passage 1F is drained, while the oil passage 1D is supplied with the pressurized oil, so that the flow-rate control valve 305 with check valve is supplied with the pressurized oil through the oil passage 1G, whereby the clutch C0 is disengaged and the brake B0 engaged, thus accomplishing the up-shift to the fourth speed gear.

When Manual Valve 210 Selects S Range

In this case, the line pressure is supplied not only to the oil passage 2 but also to the oil passage 3, as will be seen from Table 2, and the up-shift from the first speed gear to the second and third speed gears is conducted in the same manner as that in the case of the D range. However, up-shift to the fourth speed gear is prevented because the spool 242 of the 3-4 shift valve 240 is held at the upper position by the line pressure which is supplied to the lower oil chamber 244 of the 3-4 shift valve 240 from the oil passage 1 or the oil passage 3 through the 2-3 shift valve 230 and the oil passage 1A. When the second speed gear is selected, the line pressure is supplied to the servomotors of the clutches C0 and C1 and to the servomotor of the brake B2 as in the case of the D range. In addition, the line pressure is supplied also to the intermediate coast modulator valve 245 from the oil passage 3 through the 2-3 shift valve 230, oil passage 3A, 1-2 shift valve 220 and the oil passage 3D, so that pressurized oil of a pressure regulated by the intermediate coast modulator valve 245 is supplied to the oil passage 3B, thereby engaging the brake B1. Thus, the second speed in the S range permits the engine braking effect and affords a greater torque transmission capacity by virtue of the fact that both the brakes B2 and B1 are always held in the engaged state. It is to be understood also that, when the manual valve 210 is operated from the D range to the S range during running at fourth speed gear in the D range, the line pressure is introduced into the lower oil chamber 244 of the 3-4 shift valve 240, thereby effecting down-shift to the third speed gear without delay.

When Manual Valve 210 Selects L Range

In this case, the line pressure is supplied to the oil passages 2, 3 and 4 as will be seen from Table 2. The up-shift from the first speed gear to the second speed gear is conducted in the same manner as that in the D range but the up-shift to the third speed gear is prevented because the spool 232 of the 2-3 shift valve 230 is fixed at the upper position by the line pressure introduced into the lower oil chamber 233 of the 2-3 shift valve 230 from the oil passage 4. When the first speed gear is selected, the oil pressure is transmitted to the servomotor B-3 from the oil passage 4 through the 2-3 shift valve 230, oil passage 4A, low coast modulator valve 250, oil passage 4B, 1-2 shift valve 220 and the oil passage 5C, so that the brake B3 is held in the engaged state thereby allowing engine braking effect. When the second speed gear is selected, the operation is identical to that followed when the manual valve 210 selects the S range. It is to be understood also that, when the manual shift valve 230 is shifted to the L range during running with the third speed gear in the S range, down-shift to the second speed gear is effected without delay by the introduction of the line pressure into the lower oil chamber 233 of the 2-3 shift valve 230. Then, when the vehicle decelerates to a predetermined speed, the computer 600 produces an output for energizing the second solenoid valve S2, thereby effecting a down-shift from the second speed gear to the first speed gear.

When Manual Valve 210 Selects R Range

In this case, the pressure exists in the oil passage 5, while the oil passages 2, 3 and 4 are drained, as will be understood from Table 2. Since no pressure exists in the oil passages 2 and 3 leading to the servomotors of the clutch C1 and the brakes B1, B2, the clutch C1 and the brakes B1, B2 are released. The oil pressure supplied to the oil passage 5 is transmitted to the servomotor C-2 through the shuttle valve 302, flow-rate control valve 303 with check valve and the oil passage 1P, so that the clutch C2 is engaged. At the same time, the spool 222 of the 1-2 shift valve 220 is held in the upper position because the line pressure is supplied to the lower oil chamber 223 of this valve through the oil passage 1C, so that the line pressure is supplied to the oil passage 5C thereby engaging the brake B3. Meanwhile, the spool 232 of the 2-3 shift valve 230 is held in the upper position because the solenoid pressure acting in the upper oil chamber 243 of this valve reaches a low level as a result of energization of the first solenoid valve S1. Therefore, the line pressure is introduced from the oil passage 1 to the lower oil chamber 244 of the 3-4 shift valve 240 through the 2-3 shift valve 230 and the oil passage 1A, so that the spool 242 of the 3-4 shift valve is held in the upper position so as to allow the line pressure to be transmitted to the servomotor C-0 from the oil passage 1 through the 3-4 shift valve 240 and the oil passage 1F, thus engaging the clutch C0. At the same time, the oil passage 1D leading to the servomotor B-0 is drained so that the brake B0 is released, thus allowing reversing of the vehicle.

When the manual valve 210 is either in the D or S range, the line pressure is transmitted to the oil passage 2. If the spool 222 of the 1-2 shift valve 220 is in the upper position for speed ranges other than first speed, the line pressure is transmitted further to the oil passage 2A and is then introduced into the upper oil chamber 121 of the lock-up relay valve 120 through the oil passage 2D. When the line pressure exists in the upper oil chamber 121, if the third solenoid valve S3 is energized in response to the output from the computer 600 so as to maintain the pressure in the upper oil chamber 121 at the high lever, the spool 122 of the lock-up relay valve 120 is moved downwardly, thereby bringing the oil passage 1Q into communication with the oil passage 6B. Consequently, the direct clutch 16 in the torque converter T is engaged, thereby switching the torque converter T into the direct-coupling state.

In contrast, if the line pressure does not exist in the oil passage 2A or if the solenoid pressure of the low level exists in the upper oil chamber 121 because of de-energization of the third solenoid valve S3 by the output of the computer 600, the spool 122 is held in the upper position by the force produced by the line pressure introduced into the lower oil chamber 124 from the oil passage 1. In this state, the oil passage 1Q is held in communication with the oil passage 1R, so that the direct clutch 16 in the torque converter T is held in the disengaged state.

When the spool 122 is held in the upper position, i.e., when the torque converter T is not locked up, the secondary line pressure (torque converter pressure) supplied from the torque converter T to the oil passage 1S is supplied to the oil cooler O/C through the lock-up relay valve 120 and the oil passage 1T. In contrast, when the spool 122 is held in the lower position, i.e., when the torque converter is locked up, the pressurized oil is supplied to the oil cooler O/C from the oil passage 1Q through the orifice 127 in the sleeve 125 and the oil passage 1T and also from the oil passage 1 through the orifice 126 in the sleeve 125 of the lock-up relay valve 120 and the oil passages 1U and 1T.

Figure 4:
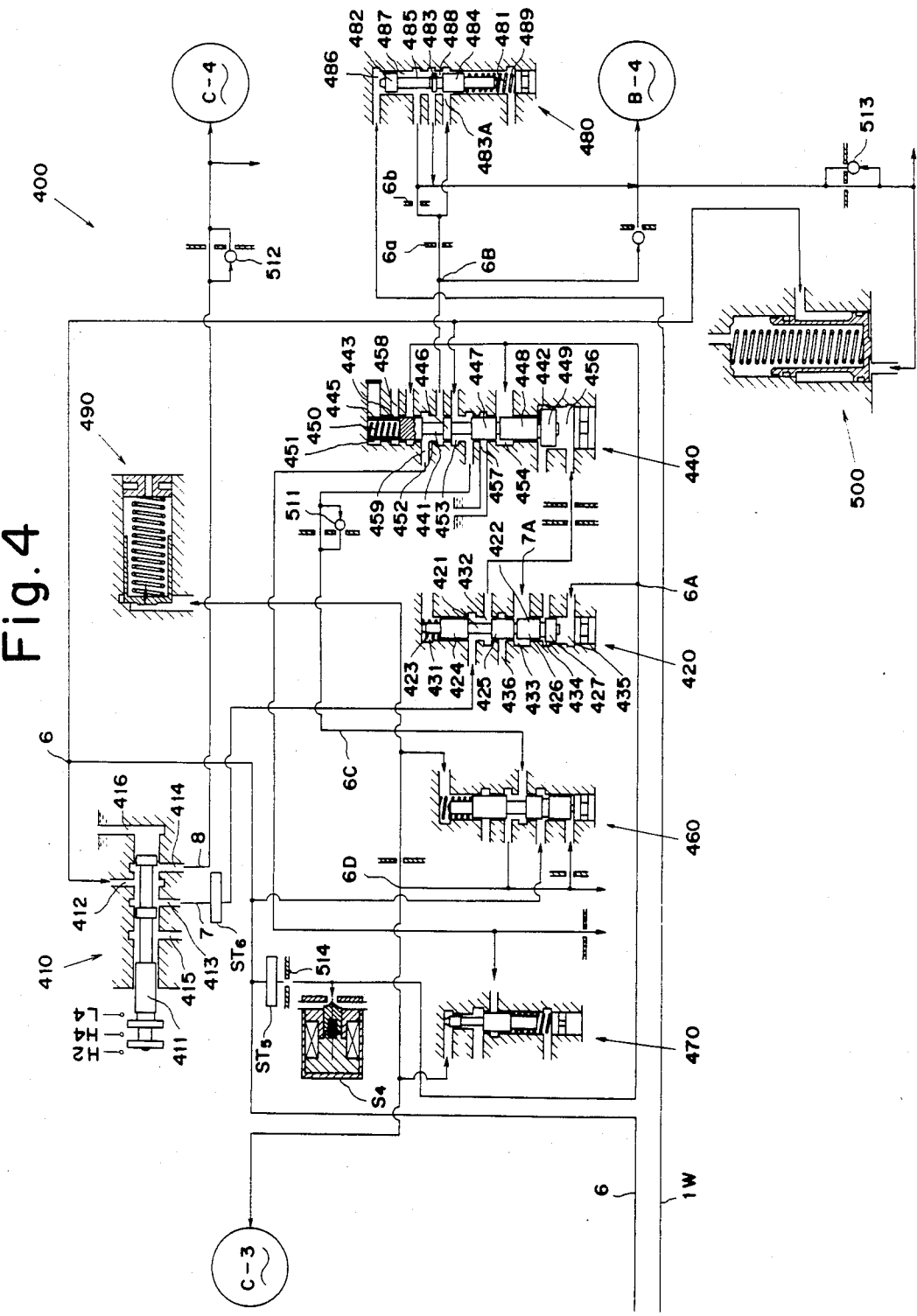
FIG. 4 is a hydraulic circuit diagram of a sub hydraulic controller for controlling a sub transmission.

FIG. 4 shows the detail of the sub hydraulic controller 400 for controlling the four-wheel drive sub transmission 50.

The sub hydraulic controller 400 is constituted by the following major parts: a transfer manual valve 410 operated manually by means of a shift lever provided in the vicinity of the driver's seat and adapted to distribute the pressurized oil supplied through the oil passage 6 of the main hydraulic controller 100 both to the oil passages 7 and 8; a relay valve 420; an inhibitor valve 440 for switching the states of engagement of the clutch C3 and the brake B4; a third accumulator control valve 460; a shift timing valve 470; an orifice control valve 480 for smoothing the engagement of the brake B4; an accumulator 490 for smoothing the engagement of the clutch C3; an accumulator 500 for smoothing the engagement of the brake B4; hydraulic servomotors C-3, C-4 and B-4 of the clutches C3, C4 and the brake B4; flow-rate control valves 511, 512 and 513 provided with check valves and adapted to control the flow rates of the pressurized oil flowing therethrough; oil strainers ST5 and ST6; a fourth solenoid valve S4 adapted to be selectively operated by an output from the computer 600; and oil passages providing communication between respective valves and servo cylinders of respective clutches and brakes.

The transfer manual valve 410 has a spool 411 which is directly connected to a shift lever (no shown) provided in the vicinity of the driver's seat. The transfer manual valve 410 also has an in-port 412 communicating with the oil passage 6 of the main hydraulic controller 100 for the main transmission 10, an out-port 413 communicating with the oil passage 7, an out-port 414 communicating with the oil passage 8, and drain ports 415 and 416. When the spool 411 of the transfer manual valve 410 is held in a two-wheel drive direct coupling (H2) position, the oil passage 6 is communicated with the oil passage 7, while the oil passage 8 is communicated with the drain port 416. When the spool 411 is held in a four-wheel drive direct coupling (H4) position, the oil passage 6 communicates with both the oil passage 7 and the oil passage 8. Finally, when the spool 411 is held in a reduced speed four-wheel drive (L4) position, the oil passage 6 is communicated with the oil passage 8, while the oil passage 7 is drained through the drain port 415.

The relay valve 420 has a spool 421 and a plunger 422 arranged in series with the spool 421. The spool 421 has lands 424 and 425 of an equal diameter and arranged at the upper and lower ends thereof, respectively, as viewed in FIG. 4, the upper land 424 being urged by a spring 423. The plunger 422 has an upper land 426 of the same diameter as the lands 424, 425 of the spool 421 and a lower land 427 of a diameter greater than the diameter of the upper land 426. The spool 421 and the plunger 422 in cooperation define an upper oil chamber 431 on the upper side of the upper land 424, a first intermediate oil chamber 432 between the upper land 424 and the lower land 425, a second intermediate oil chamber 433 between the spool 421 and the plunger 422, a third intermediate oil chamber 434 between the upper land 426 and the lower land 427, and a lower oil chamber 435 on the lower side of the lower land 427.

The operation of the relay valve 420 is as follows. When the pressurized oil is supplied to the lower oil chamber 435 from the oil passage 6A, the spool 421 and the plunger 422 are displaced upwardly, so that the oil passage 7 is brought into communication with the line pressure supply passage 7A through the first intermediate oil chamber 432, so that the supply and discharge of the line pressure to and from the lower oil chamber 456 of the inhibitor valve 440 is possible through the switching of the transfer manual valve 410. When the line pressure is supplied to the lower oil chamber 456 of the inhibitor valve 440 through the transfer manual valve 410 while the oil passage 7 is communicated with the line pressure supply passage 7A, the feedback pressure is supplied to the second intermediate oil chamber 433 so that the spool 421 is fixed at the upper position. In this state, if the solenoid valve S4 is energized in response to the output from the computer 600 so as to allow the lower oil chamber 435 to be drained, the plunger 422 alone is moved to the lower position, while the spool 421 remains in the upper position, so as to maintain the supply of the line pressure to the lower oil chamber 456 of the inhibitor valve 440. If the line pressure in the oil passage 7 is relieved through the transfer manual valve 410 in this state, or if the lower oil chamber 435 of the relay valve 420 is drained as a result of energization of the fourth solenoid valve S4 by the output from the computer 600 while the line pressure in the lower oil chamber 456 of the inhibitor valve 440 is being drained through the transfer manual valve 410 which provides communication between the oil passage 7 and the line pressure supply passage 7A, the spool 421 and the plunger 422 are displaced downwardly by the force produced by the spring 423 so as to bring the line pressure supply passage 7A into communication with the drain port 436 through the first intermediate oil chamber 432. When the spool 421 is held in the lower position, the supply and discharge of the line pressure to and from the lower oil chamber 456 of the inhibitor valve 440 through the transfer manual valve 410 does not proceed, so that the spool 441 and the plunger 442 of the inhibitor valve 440 are held in the lower positions as viewed in FIG. 4.

The inhibitor valve 440 has a spool 441 which is adapted to be moved between a first position which is on the lower side as viewed in FIG. 4 and a second position which is on the upper side as viewed in FIG. 4. The spool 441 serves as a change-over valve which conducts supply and discharge of the line pressure to and from the servomotors C-3 and B-4 of the clutch C3 and the brake B4 as it is moved between the lower first position and the upper second position. The inhibitor valve 440 also has a plunger 442 disposed in series with the spool 441 and adapted to be moved between a lower first position and an upper second position. The plunger 442, when in the upper second position, holds the spool 441 in the second position. The spool 441 has an upper sleeve-like land 445, a lower land 447 and an intermediate land 446 all having an equal diameter, and a spring 450 acting on the upper land 445 thus serving as means for setting the spool 441 in the first position. On the other hand, the plunger 442 has an upper land 448 of the same diameter as the lands of the spool 441, and a lower land 449 having a greater diameter than the upper land 448. Thus, the spool 441 and the plunger 442 define an upper oil chamber 451 on the upper side of the sleeve-like land 445, a first intermediate oil chamber 452 between the sleeve-like land 445 and the intermediate land 446, a second intermediate oil chamber 453 between the intermediate land 446 and the lower land 447, an oil chamber 454 between the spool 441 and the plunger 442, and a lower oil chamber 456.

The operation of this inhibitor valve 440 is as follows. When the spool 441 is held in the lower position, i.e., the first position, the upper oil chamber 451 is communicated with the oil passage 6A through an oil port 443 in the sleeve-like land 445, while the first intermediate oil chamber 452 and the second intermediate oil chamber 453 provide, respectively, communication between the line pressure passage 6 and a speed-reduction oil passage 6B and between a direct-coupling oil passage 6C and a drain port 457.

Conversely, when the spool 441 is held in the upper position, i.e., the second position, the upper oil chamber 451 is communicated with a drain port 458 through the oil port 443 formed in the sleeve-like land 445, while the first intermediate oil chamber 452 and the second intermediate oil chamber 453 provide, respectively, communication between the speed-reduction oil passage 6B and a drain port 459 and between the oil passage 6 and the direct-coupling oil passage 6C. On the other hand, the oil chamber 454 is communicated with an oil passage 6A which delivers oil pressure corresponding in degree to the signal supplied to the fourth solenoid valve S4. This oil pressure acting in the oil chamber 454 serves to normally bias the spool 441 to the second position, i.e., the upper position, while urging the plunger 442 to the first position, i.e., the lower position. An oil pressure maintained in the lower oil chamber 456 serves to normally maintain the plunger 442 in the second position, i.e., in the upper position.

The orifice control valve 480 is a control valve which regulates the pressure of the working oil supplied to the oil passage 6B and deliveres the regulated pressure to the hydraulic servomotor B-4. The orifice control valve 480 has a spool 485 which is biased upwardly by a spring 481. The spool 485 has an upper land 482, an intermediate land 483 and a lower land 484. The orifice control valve 480 has an upper oil chamber 486 on the upper side of the upper land 482, an upper intermediate oil chamber 487 between the upper land 482 and the intermediate land 483, a lower intermediate oil chamber 488 between the intermediate land 483 and the lower land 484, and a lower oil chamber 489 accommodating the spring 481. The spool 485 has an orifice 483A through which the upper intermediate oil chamber 487 is communicated with the lower intermediate oil chamber 488.

The upper oil chamber 486 is communicated with the oil passage 1W in the main hydraulic controller 100. The position of the spool 485 is changed in accordance with the balance between the force exerted by the spring 481 and the force produced by an oil pressure corresponding to the throttle opening and applied to the upper oil chamber 486, so as to deliver the line pressure in the oil passage 6B to the hydraulic servomotor B-4 while selectively making orifices 6a and 6b in the oil passage 6B effective.

The fourth solenoid valve S4 is controlled by the computer 600 such that it is switchable from the de-energized state to the energized state on condition that the shift lever (not shown) is in the L4 (reduced-speed four-wheel drive) range and that the state of running of the vehicle meets a predetermined condition, and from the energized state to the de-energized state on condition that the shift lever is in the H2 (two-wheel drive direct coupling) or H4 (four-wheel drive direct-coupling) range and that the state of running of the vehicle meets a predetermined condition. When de-energized, the fourth solenoid valve S4 acts to establish a solenoid pressure of high level equal to that of the line pressure in the oil passage 6A which communicates with the oil passage 2 through the orifice 514, whereas, when energized, it acts to drain the oil passage 6A, thereby generating a solenoid pressure of low level.

As stated before, the transfer manual valve 410 is operated by means of the shift lever of the sub transmission 50 provided in the vicinity of the driver's seat. This shift lever has sub shift positions Sp corresponding to the respective ranges of H2 (two-wheel drive direct-coupling), L2 (reduced-speed two-wheel drive), H4 (four-wheel drive direct-coupling) and L4 (reduced-speed four-wheel drive). The state of the brake B4 and the clutches C3 and C4, as well as the states of running of the vehicle, are shown in Table 3 in relation to respective ranges of the sub shift positions Sp.

TABLE 3

| Sp | S4 | C3 | B4 | C4 | Running Mode |
|----|----|----|----|----|--------------|
| H2 | O  | X  | E  | X  | L2           |
|    | α  | E  | X  | X  | H2           |
| H4 | O  | X  | E  | E  | L4           |
|    | α  | E  | X  | E  | H4           |
| L4 | X  | E  | X  | E  | H4           |
|    | β  | X  | E  | E  | L4           |

In Table 3, a symbol α represents the fact that, once the solenoid valve S4 is de-energized, the direct coupling condition is maintained even if the solenoid valve S4 is energized thereafter, whereas a symbol β represents the fact that, once the solenoid valve S4 is energized, the reduced-speed coupling condition is maintained even if the solenoid valve S4 is de-energized thereafter. A symbol E represents the fact that the clutch or the brake is held in the engaged state, while X represents the fact that the clutch or the brake is in the disengaged or released state.

Table 4 shows the respective states of communication between the oil passage 6 and the oil passages 7 and 8, in respective shift ranges of the sub transmission.

TABLE 4

|              | H2 | H4 | L4 |
|--------------|----|----|----|
| Oil passage 7 | O  | O  | X  |
| Oil passage 8 | X  | O  | O  |

In Table 4, the mark O represents the fact that the oil passage is supplied with the line pressure, while the mark X represents the fact that the oil passage is drained.

The operations of the sub transmission 50 in respective ranges are as follows.

(A) When Transfer Manual Valve 410 Selects H2 Range

In this case, the oil passage 7 is supplied with the line pressure, while the oil passage 8 is drained. In consequence, the hydraulic servomotor C-4 is drained so as to disengage the clutch C4. In this state, the power of the engine is not transmitted to the sleeve 53, so that the vehicle runs in the two-wheel drive mode.

When the fourth solenoid valve S4 is de-energized in accordance with the output from the computer 600, the lower oil chamber 435 of the relay valve 420 is supplied with the solenoid pressure of high level, so that the spool 421 and the plunger 422 are held in the upper positions as viewed in the drawing, whereby the oil passage 7 and the line pressure supply passage 7A are communicated with each other through the relay valve 420, thereby allowing the line pressure signal to be applied to the lower oil chamber 456 of the inhibitor valve 440. In consequence, the spool 441 and the plunger 442 of the inhibitor valve 440 are held in the second positions, i.e., upper positions, so that the oil passage 6B and, hence, the hydraulic servomotor B-4 are drained to release the brake B4. Since the spool 441 and the plunger 442 of the inhibitor valve 440 are held in the upper positions, the oil passage 6C is communicated with the oil passage 6 and, hence, with the oil passage 6D through the third accumulator control valve 460, thereby supplying the line pressure to the hydraulic servomotor C-3 and thus engaging the clutch C3. The sub transmission 50 therefore operates in the H2 (two-wheel drive direct-coupling) range.

In this state, the spool 421 is fixed in the upper position by virtue of the line pressure fed back from the line pressure supply passage 7A to the second intermediate oil chamber 433 of the relay valve 420. Therefore, even if the fourth solenoid valve S4 is energized to supply the solenoid pressure of the low level to the lower oil chamber 435, the plunger 422 alone is moved to the lower position while the spool 421 remains in the upper position, thus maintaining the supply of the line pressure signal to the lower oil chamber 456 of the inhibitor valve 440. Thus, the sub transmission 50 is maintained in the H2 (two-wheel drive direct-coupling) range, even though the fourth solenoid valve S4 is energized.

(B) When Transfer Manual Valve 410 Selects H4 Range

In this case, the line pressure is supplied both to the oil passages 7 and 8. When the fourth solenoid valve S4 is de-energized in response to the output of the computer 600, the solenoid pressure of high level is supplied to the lower oil chamber 435 of the relay valve 420, so that the spool 421 and the plunger 422 are held in the upper positions so as to provide communication between the oil passage 7 and the line pressure supply passage 7A, thereby allowing the line pressure to be supplied to the lower oil chamber 456 of the inhibitor valve 440. Consequently, the spool 441 and the plunger 442 of the inhibitor valve 440 are held in the second positions, i.e., upper positions, so that the oil passage 6B and, hence, the hydraulic servomotor B-4 are drained through the drain port 459, thereby releasing the brake B4.

Meanwhile, the oil passage 6C is held in communication with the oil passage 6 because the spool 441 and the plunger 442 of the inhibitor valve 440 are held in the second or upper positions. The oil passage 6C is communicated also with the oil passage 6D through the third accumulator control valve 460. Therefore, the line pressure is supplied to the hydraulic servomotor C-3, thereby engaging the clutch C3. On the other hand, the line pressure supplied to the oil passage 8 is introduced into the hydraulic servomotor C-4, thereby engaging the clutch C4, and thus allowing the sub transmission 50 to operate in the H4 (four-wheel drive direct-coupling) range.

In this state, the line pressure is fed back to the second intermediate oil chamber 433 of the relay valve 420 from the line pressure supply passage 7A, so taht the spool 421 is fixed in the upper position. When the fourth solenoid valve S4 is energized in this state, the plunger 422 alone is moved downwardly, while the spool 421 remains in the upper position, thereby maintaining the supply of the line pressure to the lower oil chamber 456 of the inhibitor valve 440 and, hence, the H4 (four-wheel drive direct-coupling) range of the sub transmission 50.

(C) When Transfer Manual Valve 410 Selects L4 Range

In this case, the oil passage 7 is drained, while the oil passage 8 is supplied with the line pressure, as will be seen from Table 4. Thus, the oil passages 7 and 7A are drained, while the oil passage 8 is supplied with the line pressure, regardless of the position of the relay valve 420, so that the clutch C4 is engaged to maintain the four-wheel drive mode of the sub transmission 50.

When the transfer manual valve 410 is shifted from the high speed range H2 or H4 down to the low speed range L4, if the fourth solenoid valve S4 is de-energized in response to the output from the computer 600, the solenoid pressure of high level is supplied from the oil passage 6A to the oil chamber 454 of the inhibitor valve 440, while the line pressure which has been supplied to the lower oil chamber 456 of the same valve is drained through the oil passage 7A, relay valve 420, oil passage 7 and the transfer manual valve 410. In consequence, the plunger 442 of the inhibitor valve 440 is moved to the first or lower position, but the spool 441 of the same valve remains in the second or upper position so as to maintain the H4 (four-wheel drive direct-coupling) range of the sub transmission 50.

If the fourth solenoid valve S4 has been energized in response to the output of the computer 600 when the transfer manual valve 410 is shifted to the L4 range, or if the fourth solenoid valve S4 is switched from the de-energized state to the energized state while the transfer manual valve 410 has been set in the L4 range, the solenoid pressure supplied to the oil passage 6A is changed to the low level, so that the spool 441 of the inhibitor valve 440 is set in the first or lower position by the force of the spring 450. As a result, the oil passage 6B is brought into communication with the oil passage 6, so that the hydraulic servomotor B-4 is supplied with the line pressure through the orifice 6a, orifice 6b or the orifice control valve 480, thereby engaging the brake B4. On the other hand, the oil passage 6C is communicated with the drain port 457 through the first intermediate oil chamber 452, so that the hydraulic servomotor C-3 is drained so as to disengage the clutch C3, thereby shifting the sub transmission 50 to L4 (reduced-speed four-wheel drive) range. Once the L4 range is attained, the spool 441 of the inhibitor valve 440 is not moved even if the fourth solenoid valve S4 is de-energized, because the solenoid pressure of high level established in the oil passage 6A is supplied not only to the oil chamber 454 of the inhibitor valve 440 but also to the upper oil chamber 451 of the same valve through the oil port 443 in the sleeve-like land 445 of the spool 441, so that the sub transmission 50 is maintained in the L4 (reduced-speed four-wheel drive) range.

(D) When Transfer Manual Valve 410 is Shifted to H2 or H4 Range From L4 Range While Sub Transmission 50 is in Reduced-Speed Four-Wheel Drive Mode In this case, if the fourth solenoid valve S4 has been energized by the output from the computer 600, the lower oil chamber 435 of the relay valve 420 is drained so that the spool 421 and the plunger 422 are held as a unit in the lower positions by the force of the spring 423. Therefore, the communication between the oil passage 7 and the oil passage 7A is interrupted by the upper land 424 and the lower oil chamber 456 of the inhibitor valve 440 is drained. In consequence, the spool 441 and the plunger 442 of the inhibitor valve 440 are held in the lower position by the force of the spring 450. As a result, the clutch C3 is released while the brake B4 is engaged, so that the sub transmission 50 is held in L2 (reduced-speed two-wheel drive) or L4 (reduced-speed fourth-wheel drive) range.

However, when the fourth solenoid valve S4 is de-energized by the output of the computer 600, the solenoid pressure of high level is introduced into the lower oil chamber 435 of the relay valve 420 as stated before, so that the spool 421 and the plunger 422 of the relay valve 420 are moved to the upper positions so as to provide communication between the oil passage 7 and the line pressure supply passage 7A. This in turn permits the line pressure to be supplied to the lower oil chamber 456 of the inhibitor valve 440, so that the spool 441 and the plunger 442 are moved to and held in the second or upper positions. As a result, the oil passage 6B is brought into communication with the drain port 459 and, hence, drained, so as to release the brake B4. Meanwhile, the oil passage 6C is communicated with the oil passage 6 because the spool 441 and the plunger 442 are held in the upper positions. In consequence, the oil passage 6 is brought into communication with the oil passage 6D through the third accumulator control valve 460, so that the clutch C3 is engaged to change-over the sub transmission 50 to the H2 (two-wheel drive direct-coupling) range or H4 (four-wheel drive direct-coupling) range.

FIGS. 5 to 15 show in combination a first embodiment of the transmission control device according to the present invention.

Figure 5:
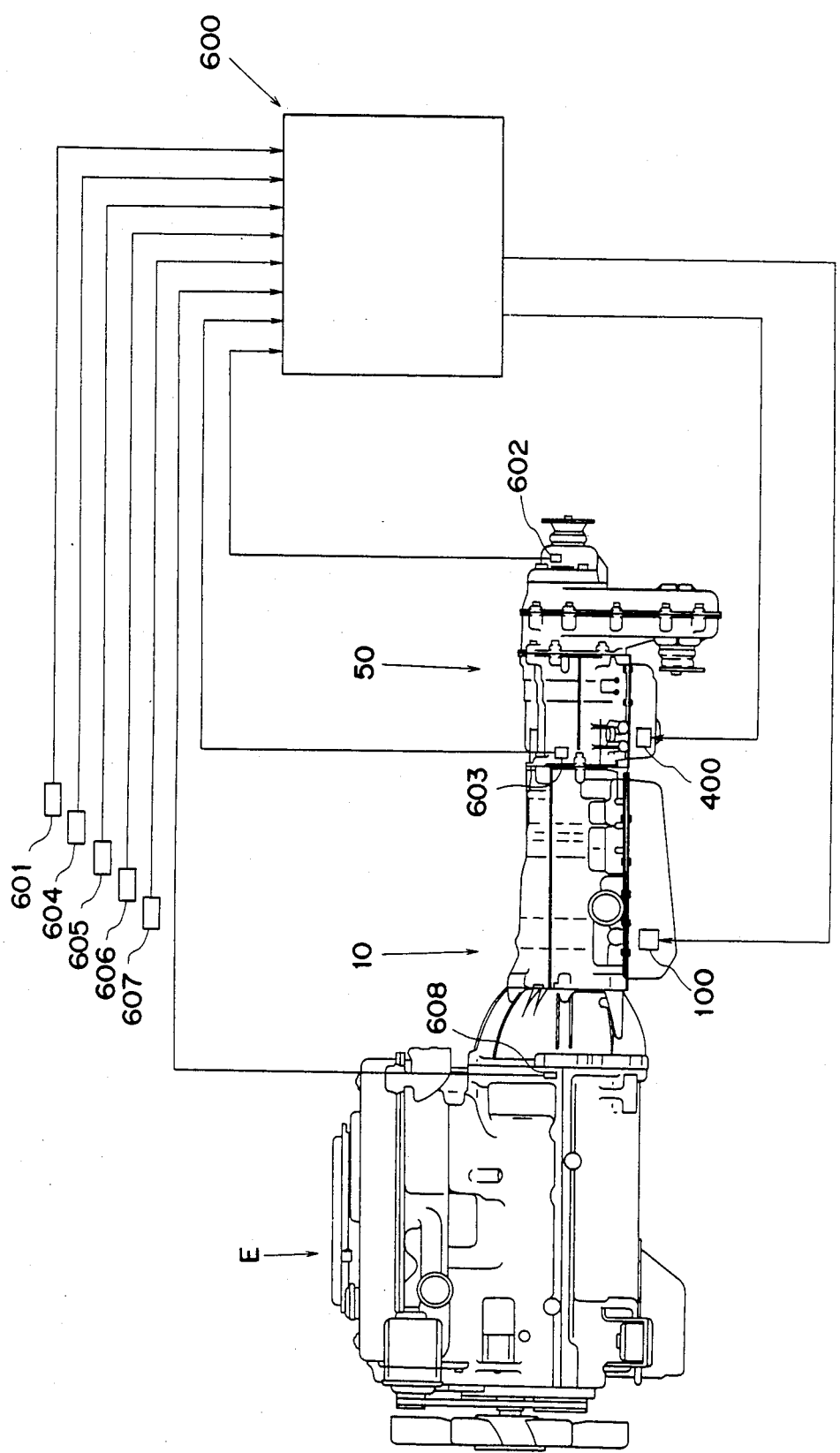
FIGS. 5 and 6 are block diagrams of an electronic controller or computer in accordance with a first embodiment of the present invention.
Figure 6:
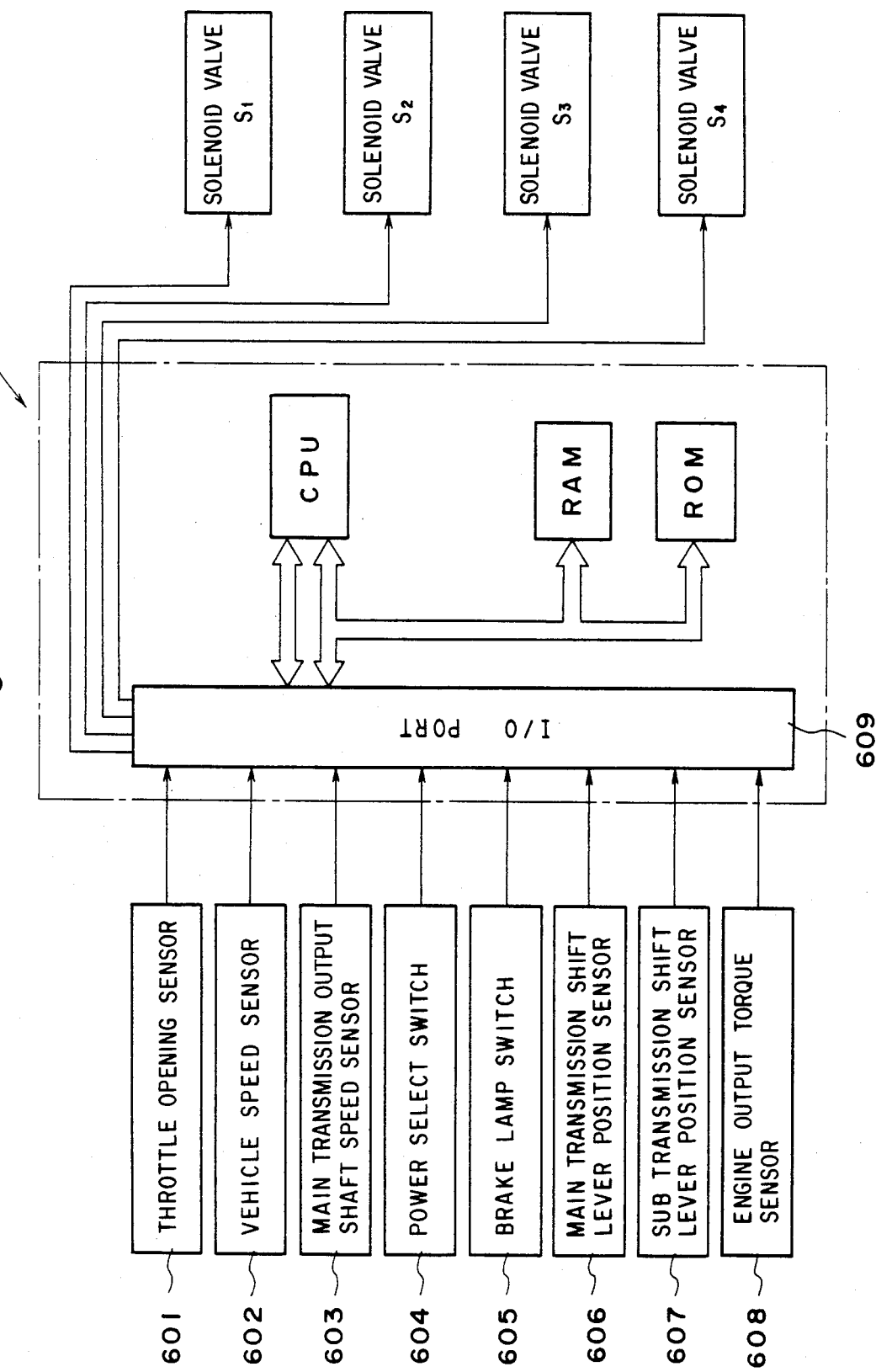

FIGS. 5 and 6 are block diagrams of the electronic controller or computer 600.

The computer 600 for controlling energization of the solenoid valves S1 to S4 of the main hydraulic controller 100 and the sub hydraulic controller 400 has the following parts: a throttle opening sensor 601 for detecting the amount by which the accelerator pedal is depressed; a vehicle speed sensor 602 which converts a signal detected from the output shaft speed of the sub transmission 50 into a vehicle running speed; a main transmission output shaft speed sensor 603 for detecting the speed of the output shaft 32 of the main transmission 10 which constitutes the input shaft of the sub transmission 50; a power select switch 604 for setting one of the shaft patterns for effecting, e.g., economy, normal, and power running operations, selected by the driver; a brake lamp switch 605; a main transmission shift lever position sensor 606 for detecting the position (Mp) of a range set in the main transmission 10; a sub transmission shift lever position sensor 607 for detecting the position (Sp) of a range set in the sub transmission 50; an engine output torque sensor 608 for detecting the engine output torque (=the torque input to the main transmission 10) from the crankshaft of the engine E; an I/O port 609 which serves as an input port to which are input the outputs from the above-mentioned sensors and switches which respectively represent conditions of running of the vehicle, the I/O port 609 serving also as an output port for outputting signals to the solenoid valves S1 to S4; a central processing unit CPU; a random-access memory RAM for effecting the shift point processing; and a read-only memory ROM which stores shift pattern data, i.e., shift points and lock-up points.

Figure 7:
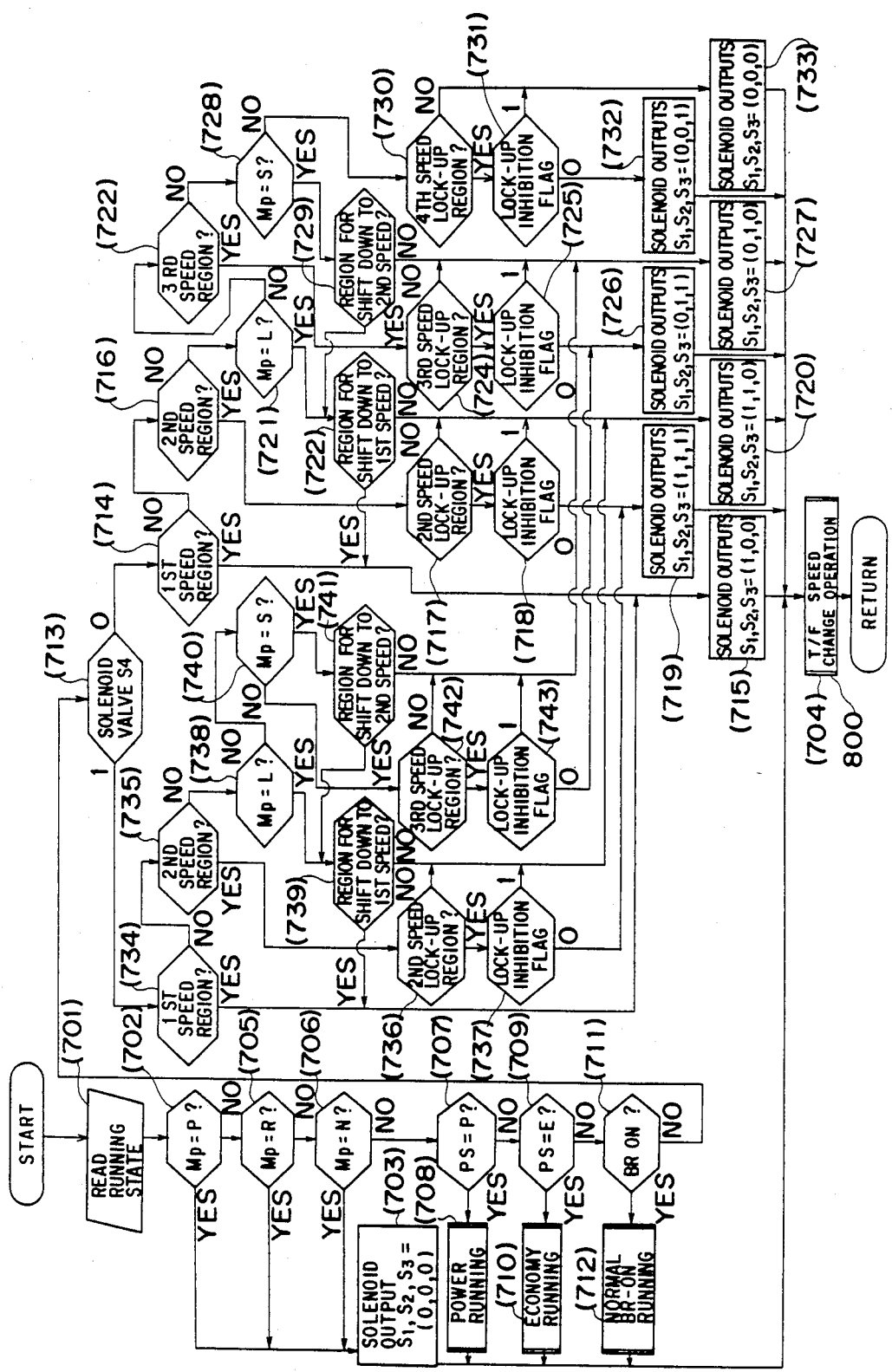
FIG. 7 is a flowchart showing a shift control operation.

The shift control will be described hereinunder with reference to the flowchart shown in FIG. 7.

The engine E of the vehicle is started by turning ON the ignition switch (not shown) of the vehicle. The state of running of the vehicle is determined (Step 701) by reading the outputs from various sensors, such as the throttle opening sensor 601, the vehicle speed sensor 602, the main transmission output shaft speed sensor 603, the power select switch 604, the brake lamp switch 605, the main transmission shift lever position sensor 606, the sub transmission shift lever position sensor 607, and the engine output torque sensor 608. Judgement is made (Step 702) as to whether or not the present shift position Mp of the main transmission 10 is set in the P (parking) range. If YES (in the case where the shift position MP is set in the P range), the computer 600 produces outputs (represented by 0) which respectively allow the solenoid valves S1, S2 and S3 to be de-energized, and the process then proceeds to Step 704. If NO (in the case where the shift position Mp is not set in the P range), judgement is made (Step 705) as to whether or not the shift position Mp is set in the R (reverse) range. If YES (in the case where the shift position Mp is set in the R range), the process proceeds to Step 703. If NO (in the case where the shift position Mp is not set in the R range), judgement is made (Step 706) as to whether or not the shift position Mp is set in the N (neutral) range. If YES (in the case where the shift position Mp is set in the N range), the process proceeds to Step 703, whereas if NO is the answer (i.e., in the case where the shift position Mp is not set in the N range), judgement is made (Step 707) as to whether or not the power select position PS is set at the power P. If YES (in the case where the power select position PS is set at the power P), power running is effected (Step 708) which is shift-controlled by a shift pattern in which the shift point is set at a relatively high level, and the process then proceeds to Step 704. If NO (in the case where the power select position PS is not set at the power P), judgement is made (Step 709) as to whether or not the power select position PS is set at the economy E. If YES (in the case where the power select position PS is set at the economy E), economy running is efffected (Step 710) which is shift-controlled by a shift pattern in which the shift point is set at a relatively low level, and the process then proceeds to Step 704. If NO (in the case where the power select position PS is not set at the economy E but at the normal), judgement is made (Step 711) as to whether or not the brake lamp switch 605 is ON. If YES, normal brake BR-ON running is effected (Step 712) which is shift-controlled by a shift pattern in which the shift point is set at a relatively high level, and the process then proceeds to Step 704. If NO (in the case where the brake lamp switch 605 is OFF), judgement is made (Step 713) as to whether or not the fourth solenoid valve S4 is in the energized state. In this embodiment, the speed mode set in the sub transmission 50 is detected from the solenoid valve S4 by making judgement as to whether or not the solenoid valve S4 is in the energized state {the speed-reduced mode is acknowledged when the solenoid valve S4 is in the energized state (represented by "1"), and the direct-coupling mode when the solenoid valve S4 is in the de-energized state (represented by "0")}. If "0" is the answer (i.e., in the case where the fourth solenoid valve S4 is in the de-energized state), judgement is made (Step 714) as to whether or not the vehicle running state is within the first speed region in a shift pattern used when the power select position PS is set at the normal and the sub transmission 50 is set in the direct-coupling mode. If YES (in the case where the vehicle running state is within the first speed region), the computer 600 produces an output (represented by "1") which allows the solenoid valve S1 to be energized and two outputs (represented by "0") which respectively allow the solenoid valves S2 and S3 to be de-energized, and the process then proceeds to Step 704. If NO (in the case where the vehicle running state is out of the first speed region), judgement is made (Step 716) as to whether or not the vehicle running state is within the second speed region in a shift pattern used when the power select position PS is set at the normal and the sub transmission 50 is set in the direct-coupling mode. If YES (in the case where the vehicle running state is within the second speed region), judgement is made (Step 717) as to whether or not the vehicle running state is within the second-speed direct clutch engageable region at the lock-up point in the direct-coupling mode. If YES (in the case where the vehicle running state is within the second-speed direct clutch engageable region), judgement is made (Step 718) as to whether the lock-up inhibition flag is "0" (the flag is down) or "1" (the flag is up). If "0" is the answer (i.e., in the case where the flag is down), the computer 600 produces outputs which respectively allow the solenoid valves S1, S2 and S3 to be energized (Step 719). If "1" is the answer in Step 718 (i.e., in the case where the flag is up), the solenoid valves S1 and S2 are energized, while the valve S3 is de-energized (Step 720), and the process then proceeds to Step 704. If NO is the answer in Step 717 (i.e., in the case where the vehicle running state is out of the second-speed direct clutch engageable region), the process proceeds to Step 720. If NO is the answer in Step 716 (i.e., in the case where the vehicle running state is out of the second speed region), judgement is made (Step 721) as to whether or not the shift position Mp is set in the L (low) range. If YES, judgement is made (Step 722) as to whether or not the vehicle running state is within the region for shift-down to the first speed. If YES, the process proceeds to Step 715, whereas if NO is the answer in Step 722, the process proceeds to Step 720. If NO is the answer in step 721 (i.e., in the case where the shift position Mp is not set in the L range), judgement is made (Step 723) as to whether or not the vehicle running state is within the third-speed region in a shift pattern used when the power select position PS is set at the normal and the sub transmission 50 is set in the direct-coupling mode. If YES (in the case where the vehicle running state is within the third-speed region), judgement is made (Step 724) as to whether or not the vehicle running state is within the third-speed direct clutch engageable region at the lock-up point in the shift pattern used when the power select position PS is set at the normal and the sub transmission 50 is set in the direct-coupling mode. If YES (in the case where the vehicle running state is within the third-speed direct clutch engageable region), judgement is made (Step 725) as to whether the lock-up inhibition flag is "0" or "1". If "0" is the answer (i.e., in the case where the flag is down), the solenoid valves S2 and S3 are energized, while the valve S1 is de-energized (Step 726). If "1" is the answer in Step 725 (i.e., in the case where the lock-up inhibition flag is up), the solenoid valve S2 is energized, while the valves S2 and S3 are de-energized (Step 727), and the process then proceeds to Step 704. If NO is the answer in Step 724 (i.e., in the case where the vehicle running state is out of the third-speed direct clutch engageable region), the process proceeds to Step 727. If NO is the answer in Step 723 (i.e., in the case where the vehicle running state is out of the third-speed region), judgement is made (Step 728) as to whether or not the shift position Mp is set in the S (second) range. If YES, judgement is made (Step 729) as to whether or not the vehicle running state is within the region for shift-down to the second speed. If YES, the process proceeds to Step 722, whereas if NO is the answer, the process proceeds to Step 727. If NO is the answer in Step 728 (i.e., in the case where the shift position Mp is not set in the S range), that is, when the vehicle running state is within the fouth-speed region, judgement is made (Step 730) as to whether or not the vehicle running state is within the fourth-speed direct clutch engageable region at the lock-up point in the shift pattern used when the power select position PS is set at the normal and the sub transmission 50 is set in the direct-coupling mode. If YES, judgement is made (Step 731) as to whether the lock-up inhibition flag is "0" or "1". If "0" is the answer (i.e., in the case where the flag is down), the solenoid valve S3 is energized, while the valves S1 and S2 are de-energized (Step 732), whereas if "1" is the ansser (i.e., in the case where the flag is up), all the solenoid valves S1, S2 and S3 are de-energized (Step 733), and the process then proceeds to Step 704. If NO is the answer in Step 730 (i.e., in the case where the vehicle running state is out of the fourth-speed direct clutch engageable region), the process proceeds to Step 734. If "1" is the answer in Step 713 (i.e., in the case where the solenoid valve S4 is in the energized state), judgement is made (Step 734) as to whether or not the vehicle running state is within the first-speed region in the shift pattern used when the power select position PS is set at the normal and the sub transmission 50 is set in the reduced-speed mode. If YES, the process proceeds to Step 715, whereas if NO is the answer in Step 734, judgement is made (Step 735) as to whether or not the vehicle runnign state is within the second-speed region in the shift pattern used when the power select position PS is set at the normal and the sub transmission 50 is set in the reduced-speed mode. If YES (in the case where the vehicle running state is within the second-speed region), judgement is made (Step 736) as to whether or not the vehicle running state is within the second-speed direct clutch engageable region at the lock-up point in the shift pattern used when the power select position PS is set at the normal and the sub transmission 50 is set in the reduced-speed mode. If YES, judgement is made (Step 737) as to whether the lock-up inhibition flag is "0" or "1". If "0" (in the case where the flag is down), the process proceeds to Step 717, whereas if "1" is the answer (i.e., in the case where the flag is up), the process proceeds to Step 720. If NO is the answer in Step 736 (i.e., in the case where the vehicle running state is out of the second-speed direct clutch engageable region), the process proceeds to Step 720. If NO is the answer in Step 735 (i.e., in the case where the vehicle running state is out of the second-speed region), judgement is made (Step 738) as to whether or not the shift position Mp is set in the L range. If YES, judgement is made (Step 739) as to whether or not the vehicle running state is within the region for shift-down to the first speed. If YES, the process proceeds to Step 715, whereas if NO is the answer in Step 739, the process proceeds to Step 720. If NO is the answer in Step 738 (i.e., in the case where the shift position Mp is not set in the L range), judgement is made (Step 740) as to whether or not the shift position Mp is set in the S range. If YES, judgement is made (Step 741) as to whether or not the vehicle running state is within the region for shift-down to the second speed. If YES, the process proceeds to Step 739, whereas if NO is the answer in Step 741 (i.e., in the case where the vehicle running state is out of said region), the process proceeds to Step 727. If NO is the answer in Step 740 (i.e., in the case where the shift position Mp is not set in the S range), judgement is made (Step 742) as to whether or not the vehicle running state is within the third-speed direct clutch engageable region at the lock-up point in the shift pattern used when the power select position PS is set at the normal and the sub transmission 50 is set in the reduced-speed mode. If YES, judgement is made (Step 743) as to whether the lock-up inhibition flag is "0" or "1". If "0" is the answer (i.e., in the case where the flag is down), the process proceeds to Step 726, whereas if "1" is the answer (i.e., in the case where the flag is up), the process proceeds to Step 727. If NO is the answer in Step 742 (i.e., in the case where the vehicle running state is out of the third-speed direct clutch engageable region), the process proceeds to Step 727. In Step 704, a transfer shifting process 800 for controlling the speed mode change-over operation of the sub transmission 50 is carried out.

The shift control by the transfer shifting process 800 will be described hereinunder with reference to the flowcharts shown in FIGS. 8 and 9.

Figure 8:
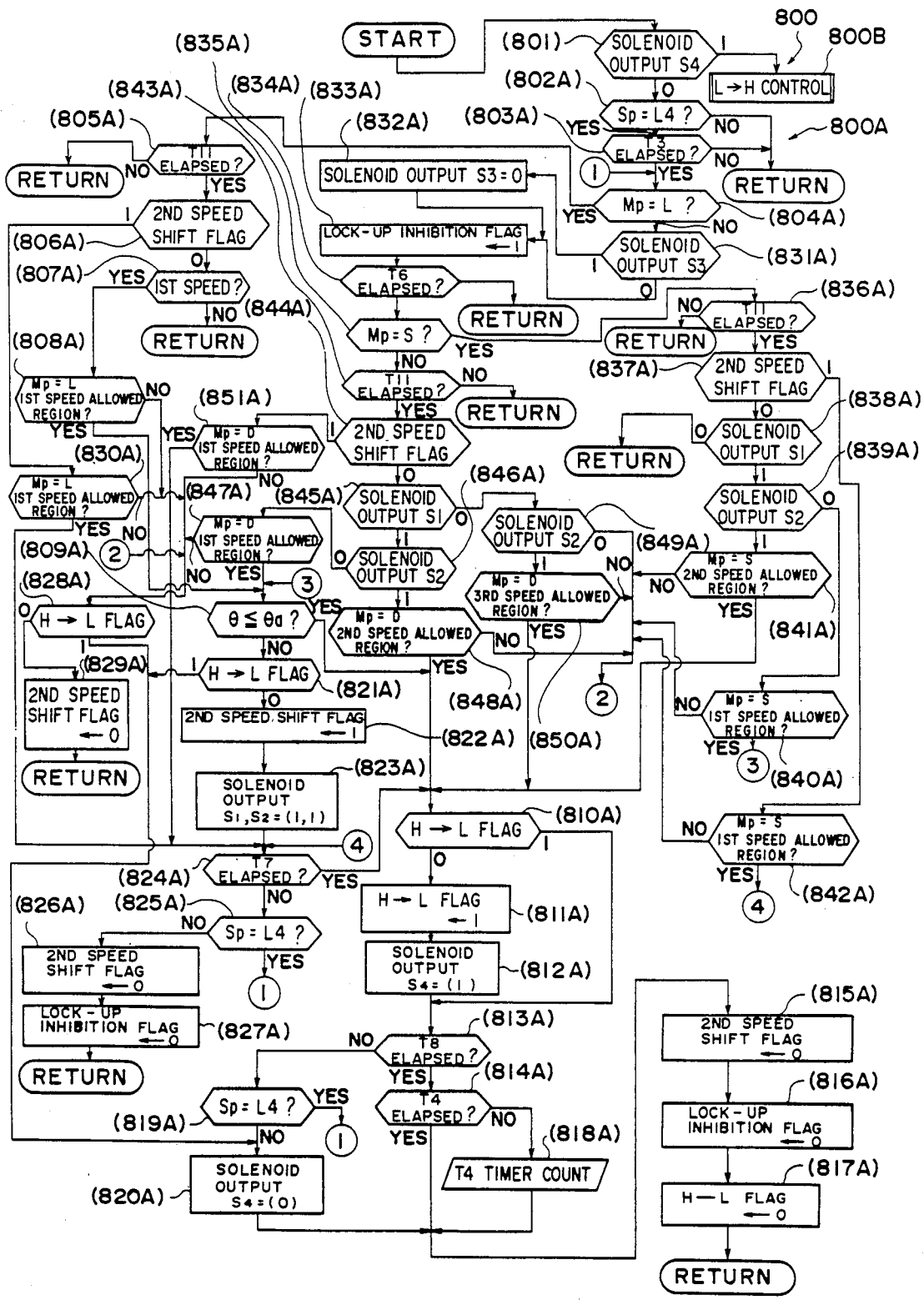
FIGS. 8 and 9 are flowcharts showing the transfer shifting process according to the present invention.

FIG. 8 is a flowchart showing the control for shifting the sub transmission 50 from the direct-coupling mode to the reduced-speed mode (hereinafter referred to as "H to L") in accordance with the transfer shifting process 800.

Figure 10:
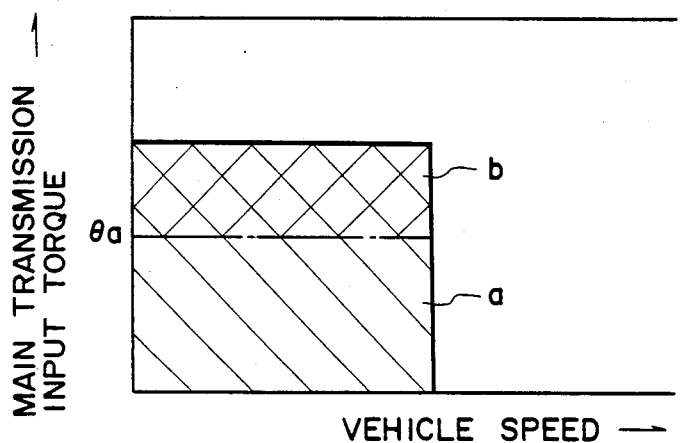
FIGS. 10 and 11 are graphs showing up-shaft regions in accordance with the first embodiment of the present invention.

First, judgement is made (Step 801) as to whether or not the output to the solenoid valve S4 is "1" (representing energization) or "0" (representing de-energization). If "1" is the answer (i.e., in the case where the valve S4 is in the energized state), the sub transmission 50 is judged to be in the reduced-speed mode, and the process proceeds to a control 800B for shifting the sub transmission 50 from the reduced-speed mode to the direct-coupling mode (hereinafter referred to as the "L to H control"). If "0" is the answer in Step 801 (i.e., in the case where the solenoid valve S4 is in the de-energized state), the sub transmission 50 is judged to be in the direct-coupling mode, and a control 800A for shifting the sub transmission 50 from the direct-coupling mode to the reduced-speed mode (hereinafter referred to as the "H to L control") is carried out. In this control 800A, judgement is first made (Step 802A) as to whether or not the shift position Sp of the sub transmission 50 is set in the L4. If NO, the process returns, whereas if YES is the answer in Step 802A, it is judged that the driver has switched the sub transmission 50 from the direct-coupling mode to the reduced-speed mode, and judgement is made (Step 803A) as to whether or not a set time T3 has elapsed, the time T3 corresponding to the period of time which starts when the main transmission 10 starts a particular speed change operation and which ends when the operation is completed. If NO (in the case where the set time T3 has not yet elapsed), it is judged that the main transmission 10 is in the course of a speed change operation, and the process returns. If YES is the answer in Step 803A (i.e., in the case where the time T3 has already elaspsed), it is judged that the speed change operation of the main transmission 10 has already been completed, and judgement is made (Step 804A) as to whether or not the shift position Mp of the main transmission 10 is set in the L range. If YES, judgement is made (Step 805A) as to whether or not a set time T11 has elapsed, the time T11 corresponding to the period time which starts when the main transmission 10 is set in the L range and which ends when a relevant speed change operation is completed. If NO (in the case where the set time T11 has not yet elapsed), the process returns, whereas if YES is the answer (i.e., in the case where the set time T11 has already elapsed), judgement is made (Step 806A) as to whether the second speed shift flag is "0" (the flag is down) or "1" (the flag is up). If "0" is the answer (i.e, in the case where the flag is down), judgement is made (Step 807A) as to whether or not the gear selected by the main transmission 10 is the first speed gear {the respective outputs to the solenoids S1, S2=(1, 0)}. If NO (in the case where the gear selected by the main transmission 10 is not the first speed gear), the process returns. If YES is the answer in Step 807A (i.e., in the case where the gear selected by the main transmission 10 is the first speed gear), judgement is made (Step 808A) as to whether or not the vehicle running state is within the region for allowing the solenoid valve S4 to be energized when the shift position Mp is set in the L range and the gear selected by the main transmission 10 is the first speed gear. If YES, judgement is made (Step 809A) as to whether or not the torque $\theta$ input to the main transmission 10 shown in FIG. 10 is less than a predetermined torque $\theta a$ (i.e., within the range denoted by a in FIG. 10). If YES, the torque input to the sub transmission 50 is judged to be relatively small, and judgement is made (Step 810A) as to whether the H to L shift flag is "0" (the flag is down) or "1" (the flag is up). If "0" is the answer, the H to L flag is set ("1") (Step 811A). Then, the computer 600 produces an output which allows the solenoid valve S4 to be energized (Step 812A), and judgement is made (Step 813A) as to whether or not a set time T8 has elapsed, the time T8 corresponding to the period of time which starts when the solenoid valve S4 is energized and which ends when the spool 441 of the inhibitor valve 440 starts to move. If YES (in the case where the set time T8 has already elapsed), judgement is made (Step 814A) as to whether or not a set time T4 (during which no speed change operation of the main transmission 10 is allowed) has elapsed, the time T4 corresponding to the period of time which starts when the solenoid valve S4 is energized and which ends when the sub transmission 50 has been shifted to the reduced-speed mode. If YES (in the case where the set time T4 has already elapsed), the second speed flag is reset ("0") (Step 815A), the lock-up inhibition flag is reset ("0") (Step 816A), and the H to L shift flag is reset ("0") (Step 817A), and then the process returns. If NO is the answer in Step 814A (i.e., in the case where the set time T4 has not yet elapsed), the respective outputs to the solenoid valves S1, S2 of the main hydraulic controller 10 are maintained as they are (Step 818A) in order to inhibit any speed change operation of the main transmission 10 during the set time T4. If NO is the answer in Step 813A (i.e., in the case where the set time T8 has not yet elapsed), judgement is made (Step 819A) as to whether or not the shift position Sp of the sub transmission 50 is set in the L4 range. If YES, the process proceeds to Step 804A, whereas if NO is the answer, the computer 600 produces an output which allows the solenoid valve S4 to be de-enerigzed (Step 820A), and the process proceeds to Step 815A. If "1" is the answer in Step 810A (i.e., in the case where the H to L flag is up), the process proceeds to Step 813A. If NO is the answer in Step 809A {i.e., in the case where the input torque $\theta$ to the main transmission 10 exceeds the set torque $\theta a$ (i.e., within the range denoted by b in FIG. 10)}, the input torque to the sub transmission 50 is judged to be excessively large, and judgement is made (Step 821A) as to whether the H to L flag is "0" or "1". If "0" is the answer (i.e., in the case where the flag is down), the second speed flag is set ("1") (Step 822A), and the computer 600 produces outputs which respectively allow the solenoid valves S1, S2 to be energized, whereby the first speed gear of the main transmission 10 is up-shifted to the second speed gear, thereby reducing the input torque to the sub transmission 50 (Step 823A). Then, judgement is made (Step 824A) as to whether or not a set time T7 has elapsed, the time T7 corresponding to the period of time which starts when the up-shift of the main transmission 10 starts due to the input torque $\theta$ to the main transmission 10 exceeding the set torque $\theta a$ and the solenoid outputs "1", "1" are consequently produced and which period ends when a relevant speed change operation is completed. If YES (in the case where the set time T7 has already elapsed), the process proceeds to Step 810A. If NO is the answer in Step 824A (i.e., in the case where the set time T7 has not yet elapsed), judgement is made (Step 825A) as to whether or not the shift position Sp of the sub transmission 50 is set in the L4 range. If YES, the process proceeds to Step 804A, whereas if NO is the answer, the second speed shift flag is reset ("0") (Step 826A), and the lock-up inhibition flag is reset ("0") (Step 827A), and then, the process returns. If "1" is the answer in Step 821A (i.e., in the case where the H to L shift flag is up), the process proceeds to Step 820A. If NO is the answer in Step 808A (i.e., in the case where the vehicle running state is out of the region for allowing the solenoid valve S4 to be energized), judgement is made (Step 828A) as to whether the H to L shift flag is "0" or "1". If "0" is the answer (i.e., in the case where the flag is down), the second speed shift flag is reset ("0") (Step 829A), and the process then returns. If "1" is the answer in Step 828A (i.e., in the case where the second speed shift flag is up), the process proceeds to Step 820A. If "1" is the answer in Step 806A (i.e., in the case where the second speed shift flag is up), judgement is made (Step 830A) as to whether or not the vehicle running state is within the region for allowing the solenoid valve S4 to be energized (within the range denoted by a in FIG. 10) when the shift position Mp is set in the L range and the gear selected by the main transmission 10 is the first speed gear. If YES, the process proceeds to Step 824A, whereas if NO is the answer, the process proceeds to Step 828A. If NO is the answer in Step 804A (i.e., in the case where the shift position Mp is not set in the L range), judgement is made (Step 831A) as to whether the output to the solenoid valve S3 which effects lock-up control of the main transmission 10 is "1" (representing energization) or "0" (representing de-energization). If "1" is the answer (i.e., in the case where the valve S3 is in the energized state), the valve S3 is de-energized (Step 832A), whereas if "0" is the answer (i.e., in the case where the solenoid valve S3 is in the de-energized state), the lock-up inhibition flag is set ("1") (Step 833A). Then, judgement is made (Step 834A) as to whether or not a set time T6 has elapsed, the time T6 corresponding to the period of time which starts when the solenoid valve S3 is de-energized and which ends when the direct clutch 16 is disengaged. If NO (in the case where the set time T6 has not yet elapsed), the process returns, whereas if YES is the answer, judgement is made (Step 835A) as to whether or not the shift position Mp of the main transmission 10 is set in the S range. If YES, judgement is made (Step 836A) as to whether or not the set time T11 has elapsed, the time T11 corresponding to the period of time which starts when the main transmission 10 is set in the S range and which ends when a relevant speed change operation is completed. If NO, the process returns, whereas if YES is the answer, judgement is made (Step 837A) as to whether the second speed shift flag is "0" or "1". If "0" is the answer (i.e., in the case where the flag is up), judgement is made (Step 838A) as to whether the output to the solenoid valve S1 is "1" (representing energization) or "0" (representing de-energization). If "0" is the answer (i.e., in the case where the valve S1 is in the de-energized state), it is judged that the third speed gear is selected, and the process returns, whereas if "1" is the answer (i.e., in the case where the solenoid valve S1 is in the energized state), judgement is made (Step 839A) as to whether the output to the valve S2 is "1" (representing energization) or "0" (representing de-energization). If "0" is the answer (i.e., in the case where the valve S2 is in the de-energized state), it is judged that the gear selected by the main transmission 10 is the first speed gear, and judgement is made (Step 840A) as to whether or not the vehicle running state is within the region for allowing the solenoid valve S4 to be energized when the shift position Mp is set in the S range and the gear selected by the main transmission 10 is the first speed gear. If YES, the process proceeds to Step 809A, whereas if NO is the answer, the process proceeds to Step 828A. If YES is the answer in Step 839A (i.e., in the case where the solenoid valve S2 is in the energized state), it is judged that the gear selected by the main transmission 10 is the second speed gear, and judgement is made (Step 841A) as to whether or not the vehicle running state is within the region for allowing the solenoid valve S4 to be energized when the shift position Mp is set in the S range and the gear selected by the main transmission 10 is the second speed gear. If YES, the process proceeds to Step 810A, whereas if NO is the answer, the process proceeds to Step 828A. If "1" is the answer in Step 837A (i.e., in the case where the second speed shift flag is up), judgement is made (Step 842A) as to whether or not the vehicle running state is within the region for allowing the solenoid valve S4 to be energized when the shift position Mp is set in the S range and the gear selected by the main transmissison 10 is the first speed gear. If YES, the process proceeds to Step 824A, whereas if NO is the answer, the process proceeds to Step 828A. If NO is the answer in Step 835A (i.e., in the case where the shift position Mp is not set in the S range), judgement is made (Step 843A) as to whether or not the set time T11 has elapsed, the time T11 corresponding to the period of time which starts when the shift position Mp of the main transmission 10 is changed and which ends when a relevant speed change operation is completed. If NO, the process returns, whereas if YES is the answer, judgement is made (Step 844A) as to whether the second speed shift flag is "0" or "1". If "0" is the answer (i.e., in the case where the flag is down), judgement is made (Step 845A) as to whether the output to the solenoid valve S1 is "1" (representing energization) or "0" (representing de-energization). If "1" is the answer (i.e., in the case where the valve S1 is in the energized state), judgement is made (Step 846A) as to whether the output to the solenoid valve S2 is "1" (representing energization) or "0" (representing de-energization). If "0" is the answer (i.e., in the case where the valve S2 is in the de-energized state), it is judged that the gear selected by the main transmission 10 is the first speed gear, and judgement is made (Step 847A) as to whether or not the vehicle running state is within the region for allowing the solenoid valve S4 to be energized when the shift position Mp is set in the D range and the gear selected by the main transmission 10 is the first speed gear. If YES, the process proceeds to Step 809A, whereas if NO is the answer, the process proceeds to Step 828A. If "1" is the answer in Step 846A (i.e, in the case where the solenoid valve S2 is in the energized state), it is judged that the gear selected by the main transmission 10 is the second speed gear, and judgement is made (Step 848A) as to whether or not the vehicle running state is within the region for allowing the solenoid valve S4 to be energized when the shift position Mp is set in the D range and the gear selected by the main transmission 10 is the second speed gear. If YES, the process proceeds to Step 810A, whereas if NO is the answer, the process proceeds to Step 828A. If "0" is the answer in Step 845A (i.e., in the case where the solenoid valve S1 is in the de-energized state), judgement is made (Step 849A) as to whether or not the output to the solenoid valve S2 is "1" (representing energization) or "0" (representing de-energization). If "1" is the answer (i.e., in the case where the valve S2 is in the de-energized state), it is judged that the gear selected by the main transmission 10 is the third speed gear, and judgement is made (Step 850A) as to whether or not the vehicle running state is within the region for allowing the solenoid valve S4 to be energized when the shift position Mp is set in the D range and the gear selected by the main transmssion 10 is the third speed gear. If YES, the process proceeds to Step 810A, whereas if NO is the answer, the process proceeds to Step 828A. If "0" is the answer in Step 849A (i.e., in the case where the solenoid valve S2 is in the de-energized state), it is judged that the gear selected by the main transmission 10 is the fourth speed gear, and the process proceeds to Step 828A. If "1" is the answer in Step 844A (i.e., in the case where the second speed shift flag is up), judgement is made (Step 851A) as to whether or not the vehicle running state is within the region for the fourth solenoid valve S4 to be energized when the shift position Mp is set in the D range and the gear selected by the main transmission 10 is the first speed gear. If YES, the process proceeds to Step 824A, whereas if NO is the answer, the process proceeds to Step 828A.

Figure 9:
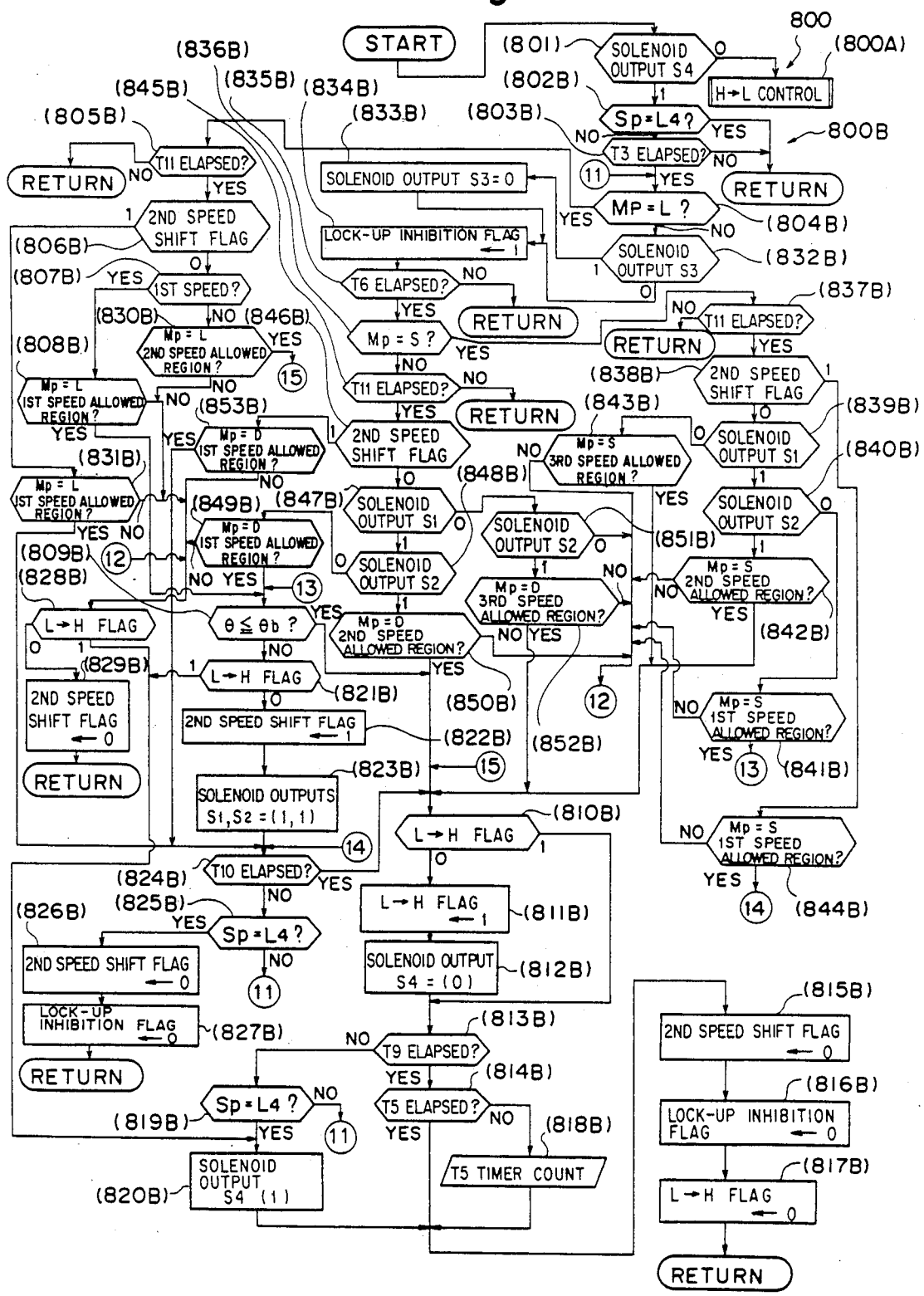

FIG. 9 is a flowchart showing the control for shifting the sub transmission 50 from the reduced-speed mode to the direct-coupling mode (hereinafter referred to as "L to H") in accordance with the transfer shifting process 800.

Figure 11:
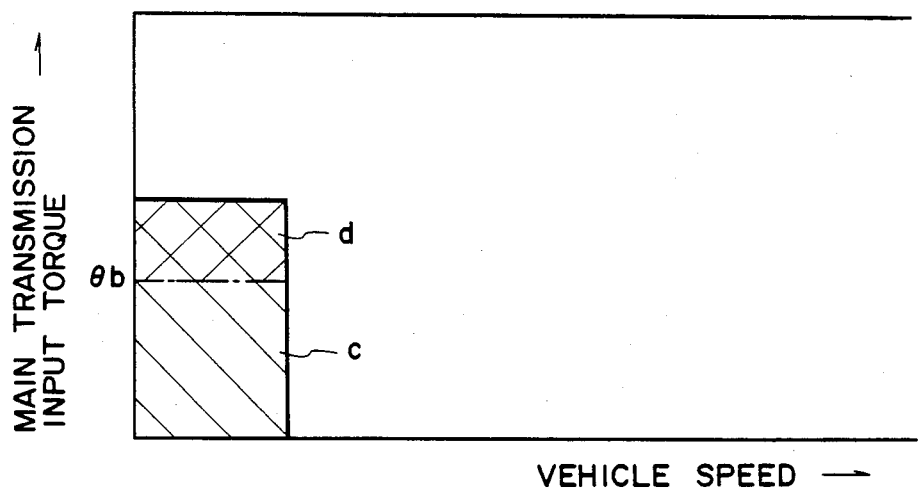

First of all, judgement is made (Step 801) as to whether the output to the solenoid valve S4 is "1" (representing energization) or "0" (representing de-energization). If "0" is the answer, it is judged that the the sub transmission 50 is set in the direct-coupling mode, and the process proceeds to the H to L control 800A, whereas if "1" is the answer, it is judged that the sub transmission 50 is set in the reduced-speed mode, and the L to H control 800B is carried out. In this control 800B, judgement is first made (Step 802B) as to whether or not the shift position Sp of the sub transmission 50 is set in the L4 range. If YES, the process returns, whereas if NO is the answer, it is judged that the driver has switched the sub transmission 50 from the reduced-speed mode to the direct-coupling mode, and judgement is made (Step 803B) as to whether or not a set time T3 has elapsed, the time T3 corresponding to the period of time which starts when the main transmission 10 starts a particular speed change operation and which ends when the operation is completed. If NO, it is judged that the main transmission 10 is in the course of a speed change operation, and the process returns. If YES is the answer in Step 803B (i.e., in the case where the set time T3 has already elapsed), it is judged that the speed change operation of the main transmission 10 has already been completed, and judgement is made (Step 804B) as to whether or not the shift position Mp of the main transmission 10 is set in the L range. If YES, judgement is made (Step 805B) as to whether or not the set time 11 has elapsed, the time T11 corresponding to the period of time which starts when the main transmission 10 is set in the L range and which ends when a relevant speed change operation is completed. If NO, the process returns, whereas If YES is the answer in Step 805B, judgement is made (Step 806B) as to whether the second speed shift flag is "0" (the flag is down) or "1" (the flag is up). If "0" is the answer, judgement is made (Step 807B) as to whether or not the gear selected by the main transmission 10 is the first speed gear {the respective outputs to the solenoids S1, S2=(1, 0)}. If YES, judgement is made (Step 808B) as to whether or not the vehicle running state is within the region for allowing the solenoid valve S4 to be de-energized when the shift position Mp is set in the L range and the gear selected by the main transmission 10 is the first speed gear. If YES, judgement is made (Step 809B) as to whether or not the torque $\theta$ input to the main transmission 10 shown in FIG. 11 is less than a predetermined torque $\theta b$ (i.e., within the range denoted by c in FIG. 11). If YES, it is judged that the input torque to the sub transmission 50 is judged to be relatively small, and judgement is made (Step 810B) as to whether the L to H shift flag is "0" (the flag is down) or "1" (the flag is up). If "0" is the answer (i.e., in the case where the flag is down), the L to H shift flag is set ("1") (Step 811B). Then, the computer 600 produces an output which allows the solenoid valve S4 to be de-energized (Step 812B), and judgement is made (Step 813B) as to whether or not the set time T9 has elapsed, the time T9 corresponding to the period of time which starts when the solenoid valve S4 is de-energized and which ends when the spool 441 of the inhibitor valve 440 starts to move. If YES (in the case where the set time T9 has already elapsed), judgement is made (Step 814B) as to whether or not a set time T5 (during which no speed change operation of the main transmission 10 is allowed) has elapsed, the time T5 corresponding to the period of time which starts when the solenoid valve S4 is de-energized and which ends when the sub transmission 50 has been shifted to the direct-coupling mode. If YES, the second speed shift flag is reset ("0") (Step 815B), the lock-up inhibition flag is reset ("0") (Step 816B), and the L to H shift flag is reset ("0") (Step 817B), and then, the process returns. If NO is the answer in Step 814B (i.e., in the case where the set time T5 has not yet elapsed), the respective outputs to the solenoid valves S1, S2 of the main hydraulic controller 100 are maintained as they are (Step 818B) in order to inhibit any speed change operation of the main transmission 10 during the set time T5. If NO is the answer in Step 813B (i.e., in the case where the set time T8 has not yet elapsed), judgement is made (Step 819B) as to whether or not the shift position Sp of the sub transmission 50 is set in the L4 range. If NO, the process proceeds to Step 804B, whereas if YES is the answer, the computer 600 produces an output which allows the solenoid valve S4 to be energized (Step 820B), and the process proceeds to Step 815B. If "1" is the answer in Step 810B, (i.e., the L to H shift flag is up), the process proceeds to Step 813B. If NO is the answer in Step 809B {i.e., in the case where the input torque $\theta$ to the main transmission 10 exceeds the set torque $\theta b$ (i.e., within the range denoted by d in FIG. 11)}, it is judged that the input torque to the sub transmission 50 is judged to be excessively large, and judgement is made (Step 821B) as to whether the L to H shift flag is "0" or "1". If "0" (in the case where the flag is down), the second speed shift flag is set ("1") (Step 822B), and the computer 600 produces outputs which respectively allow the solenoid valves S1, S2 to be energized, thereby up-shifting the main transmission 10 from the first speed gear to the second speed gear and thus reducing the input torque to the sub transmissison 50 (Step 823B). Then, judgement is made (Step 824B) as to whether or not a set time T10 has elapsed, the time T10 corresponding to the period of time which starts when the up-shift of the main transmission 10 starts due to the input torque $\theta$ to the main transmission 10 exceeding the set torque $\theta b$ and the solenoid outputs "1", "1" are consequently produced and which period ends when a relevant speed change operation is completed. If YES (in the case where the set time T10 has already elapsed), the process proceeds to Step 810B, whereas if NO is the answer in Step 824B, judgement is made (Step 825B) as to whether or not the shift position Sp of the sub transmission 50 is set in the L4 range. If NO, the process proceeds to Step 804B, whereas if YES is the answer, the second speed shift flag is reset ("0") (Step 826B), and the lock-up inhibition flag is reset ("0") (Step 827B), and then, the process returns. If "1" is the answer in Step 821B (i.e., in the case where the L to H shift flag is up), the process proceeds to Step 820B. If NO is the answer in Step 808B (i.e., in the case where the vehicle running state is out of the region for allowing the solenoid valve S4 to be de-energized), judgement is made (Step 828B) as to whether the L to H shift flag is "0" or "1". If "0" (in the case where the flag is down), the second speed shift flag is reset ("0") (Step 829B), and the process then returns. If "1" is the answer (in the cae where the second speed shift falg is up), the process proceeds to Step 820B. If NO is the answer in Step 807B (i.e., in the case where the gear selected by the main transmission 10 is not the first speed gear), it is judged that the gear selected by the main transmission 10 is the second speed gear, and judgement is made (Step 830B) as to whether or not the vehicle running state is within the region for allowing the solenoid valve S4 to be de-energized when the shift position Mp is set in the L range. If YES, the process proceeds to Step 810B, whereas if NO is the answer, the process proceeds to Step 828B. If "1" is the answer in Step 806B (i.e., in the case where the second speed shift flag is up), judgement is made (Step 831B) as to whether or not the vehicle running state is within the region for allowing the solenoid valve S4 to be de-energized when the shift position Mp is set in the L range and the gear selected by the main transmission 10 is the first speed gear. If YES, the process proceeds to Step 824B, whereas if NO is the answer, the process proceeds to Step 828B. If NO is the answer in Step 804B (i.e., in the case where the shift position Mp is not set in the L range), judgement is made (Step 832B) as to whether the output to the solenoid valve S3 which effects lock-up control of the main transmission 10 is "1" (representing energization) or "0" (representing de-energization). If "1" is the answer (in the case where the valve S3 is in the energized state), the valve S3 is de-energized (Step 833B), whereas if "0" is the answer (in the case where the valve S3 is in the de-energized state), the lock-up inhibition flag is set ("1") (Step 834B). Then, judgement is made (Step 835B) as to whether or not the time T6 has elapsed, the time T6 corresponding to the period of time which starts when the solenoid valve S3 is de-energized and which ends when the direct clutch 16 is disengaged. If NO (in the case where the time T6 has not yet elapsed), the process returns, whereas if YES is the answer in Step 835B, judgement is made (Step 836B) as to whether or not the shift position Mp of the main transmission 10 is set in the S range. If YES, judgement is made (Step 837B) as to whether or not the set time T11 has elapsed, the time T11 corresponding to the period of time which starts when the main transmission 10 is set in the S range and which ends when a relevant speed change operation is completed. If NO, the process returns, whereas if YES is the answer, judgement is made (Step 838B) as to whether the second speed shift flag is "0" or "1". If "0" is the answer (in the case where the flag is down), judgement is made (Step 839B) as to whether the output to the solenoid valve S1 is "1" (representing energization) or "0" (representing de-energization). If "1" is the answer (i.e., in the case where the valve S1 is in the energized state), judgement is made (Step 840B) as to whether the output to the solenoid valve S2 is "1" (representing energization) or "0" (representing de-energization). If "0" is the answer (in the case where the valve S2 is in the de-energized state), it is judged that the gear selected by the main transmission 10 is the first speed gear, and judgement is made (Step 841B) as to whether or not the vehicle running state is within the region for allowing the solenoid valve S4 to be de-energized when the shift position Mp is set in the S range and the gear selected by the main transmission 10 is the first speed gear. If YES, the process proceeds to Step 809B, whereas if NO is the answer, the process proceeds to Step 828B. If "1" is the answer in Step 840B (i.e., in the case where the solenoid valve S2 is in the energized state), it is judged that the gear selected by the main transmission 10 is the second speed gear, and judgement is made (Step 842B) as to whether or not the vehicle running state is within the region for allowing the solenoid valve S4 to be de-energized when the shift position Mp is set in the S range and the gear selected by the main transmission 10 is the second speed gear. If YES, the process proceeds to Step 810B, whereas if NO is the answer in Step 842B, the process proceeds to Step 828B. If "0" is the answer in Step 839B (i.e., in the case where the solenoid valve S1 is in the de-energized state), it is judged that the gear selected by the main transmission 10 is the third speed gear, and judgement is made (Step 843B) as to whether or not the vehicle running state is within the region for allowing the solenoid valve S4 to be de-energized when the shift position Mp is set in the S range and the gear selected by the main transmission 10 is the third speed gear. If YES, the process proceeds to Step 810B, whereas if NO is the answer in Step 843B, the process proceeds to Step 828B. If "1" is the answer in Step 837B (i.e., in the case where the second speed shift flag is up), judgement is made (Step 844B) as to whether or not the vehicle running state is within the region for allowing the solenoid valve S4 to be de-energized when the shift position Mp is set in the S range and the gear selected by the main transmission 10 is the first speed gear. If YES, the process proceeds to Step 824B, whereas if NO is the answer in Step 844B, the process proceeds to Step 828B. If NO is the answer in Step 836B (i.e., in the case where the shift position Mp is not set in the S range), judgement is made (Step 845B) as to whether or not the set time T11 has elapsed, the time T11 corresponding to the period of time which starts when the shift position Mp of the main transmission 10 is changed and which ends when a relevant speed change operation is completed. If NO, the process returns, whereas if YES is the answer in Step 845B, judgement is made (Step 846B) as to whether the second speed shift flag is "0" or "1". If "0" is the answer (in the case where the flag is down), judgement is made (Step 847B) as to whether the output to the solenoid valve S1 is "1" (energization) or "0" (de-energization). If "1" is the answer (i.e., in the case where the solenoid valve S1 is in the energized state), judgement is made (Step 848B) as to whether the output to the solenoid valve S2 is "1" (energization) or "0" (de-energization). If "0" is the answer (i.e., in the case where the solenoid valve S2 is in the de-energized state), it is judged that the gear selected by the main transmission 10 is the first speed gear, and judgement is made (Step 849B) as to whether or not the vehicle running state is within the region for allowing the solenoid valve S4 to be de-energized when the shift position Mp is set in the D range and the gear selected by the main transmission 10 is the first speed gear. If YES, the process proceeds to Step 809B, whereas if NO is the answer in Step 849B, the process proceeds to Step 828B. If "1" is the answer in Step 849B (i.e., in the case where the solenoid valve S2 is the energized state), it is judged that the gear selected by the main transmission 10 is the second speed gear, and judgement is made (Step 850B) as to whether or not the vehicle running state is within the region for allowing the solenoid valve S4 to be de-energized when the shift position Mp is set in the D range and the gear selected by the main transmission 10 is the second speed gear. If YES, the process proceeds to Step 810B, whereas NO is the answer in Step 850B, the process proceeds to Step 828B. If "0" is the answer in Step 847B (i.e., in the case where the solenoid valve S1 is in the de-energized state), judgement is made (Step 851B) as to whether the output to the solenoid valve S2 is "1" (energization) or "0" (de-energization). If "1" is the answer in Step 851B (i.e., in the case where the solenoid valve S2 is in the energized state), it is judged that the gear selected by the main transmission 10 is the third speed gear, and judgement is made (Step 825B) as to whether or not the vehicle running state is within the region for allowing the solenoid valve S4 to be de-energized when the shift position Mp is set in the D range and the gear selected by the main transmission 10 is the third speed gear. If YES, the process proceeds to Sep 810B, whereas if NO is the answer in Step 852B, the process proceeds to Step 828B. If "0" is the answer in Step 851B (i.e., in the case where the solenoid valve S2 is in the de-energized state), it is judged that the gear selected by the main transmission 10 is the fourth speed gear, and the process proceeds to Step 828B. If "1" is the answer in Step 846B (i.e., in the case where the second speed shift flag is up), judgement is made (Step 835B) as to whether or not the vehicle running state is within the region for allowing the solenoid valve S4 to be de-energized when the shift position Mp is set in the D range and the gear selected by the main transmission 10 is the first speed gear. If YES, the process proceeds to Step 824B, whereas if NO is the answer in Step 853B, the process proceeds to Step 828B.

FIGS. 12 to 15 shows a second embodiment of the transmission control device according to the present invention.

Figure 12:
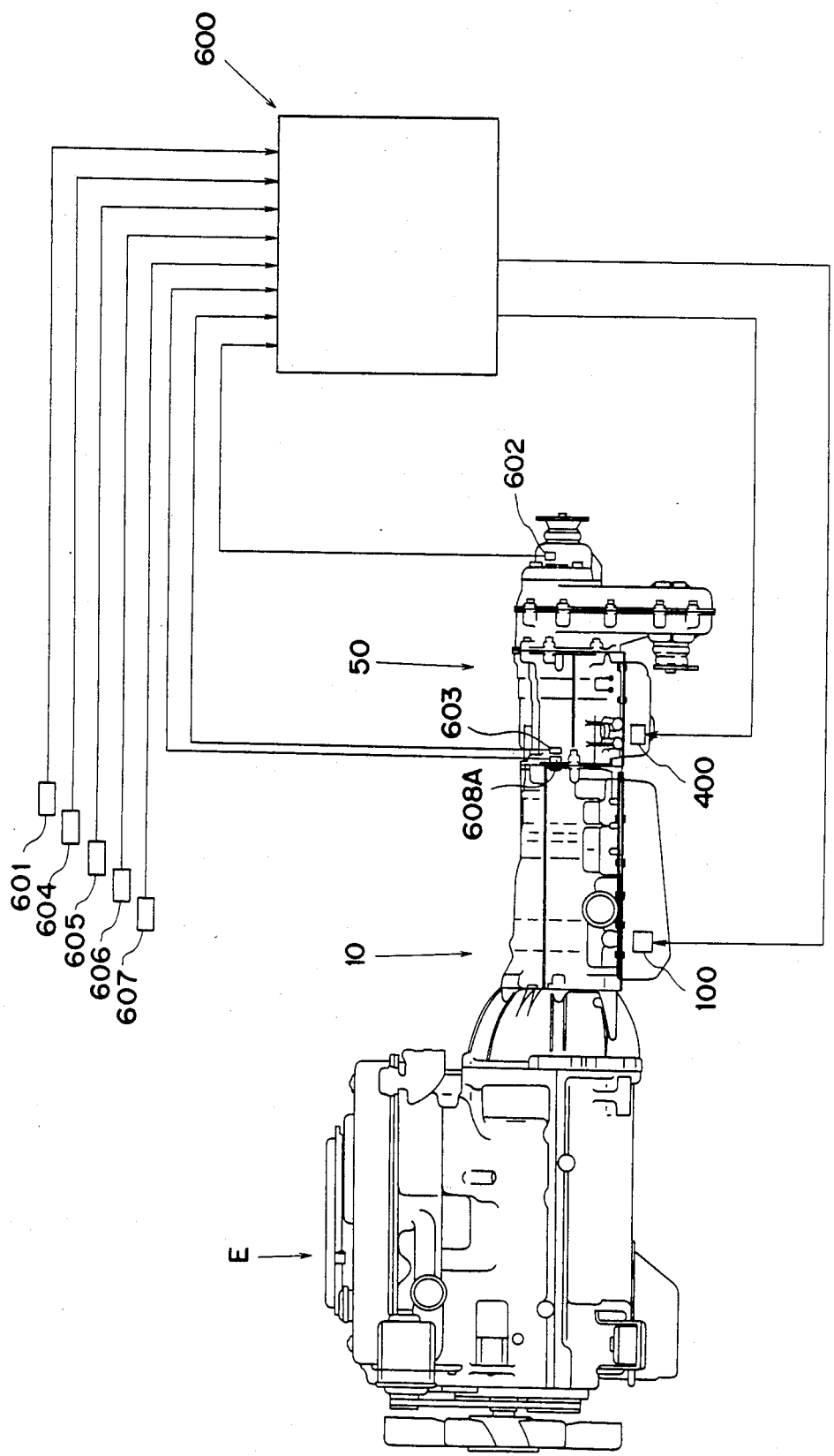
FIGS. 12 and 13 are block diagrams of an electronic controller or computer in accordance with a second embodiment of the present invention.
Figure 13:
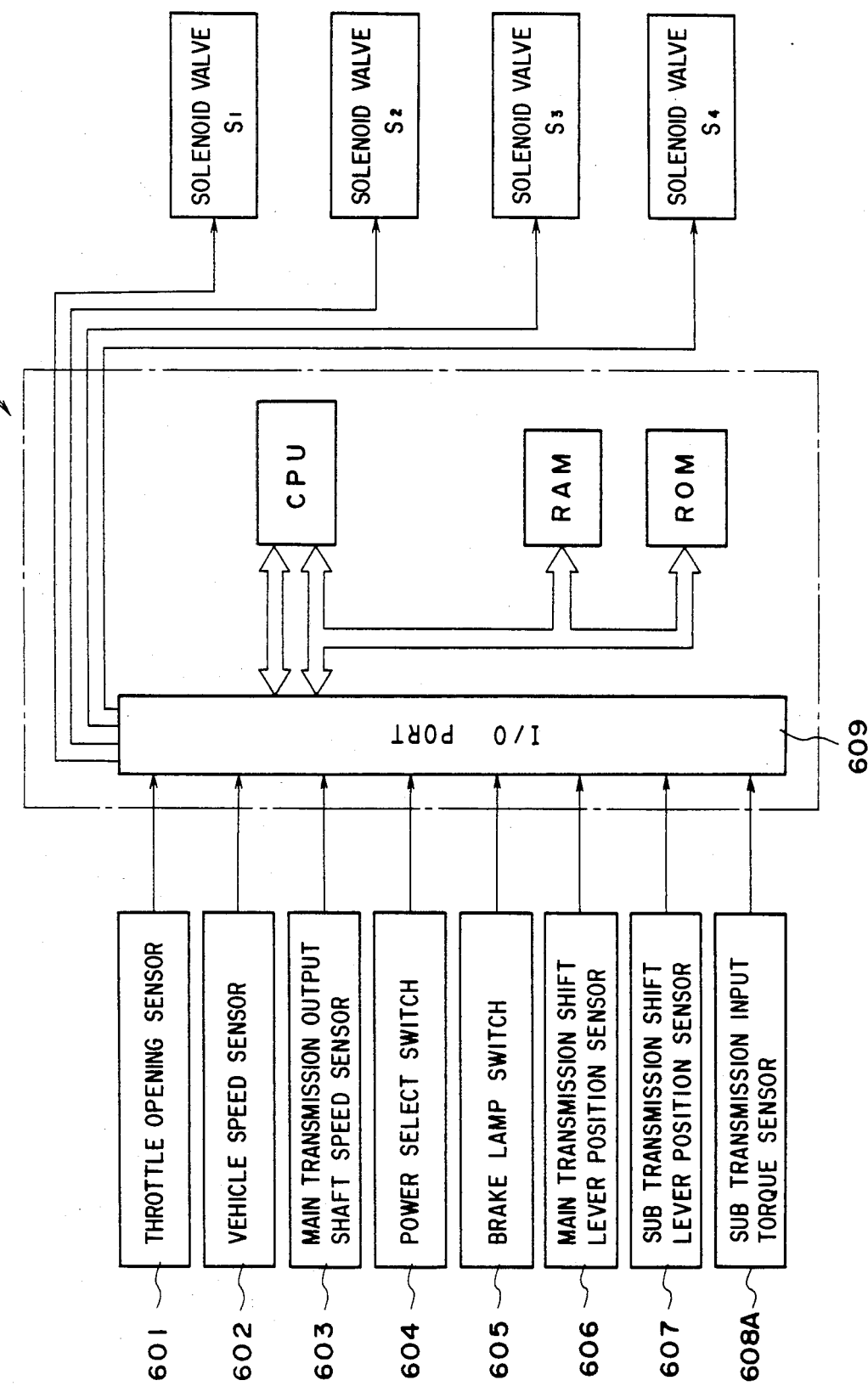

FIGS. 12 and 13 are block diagrams of the electronic controller or computer 600 in accordance with the second embodiment.

In this embodiment, a sub transmission input torque sensor 608A for detecting the torque output from the output shaft 32 of the main transmission 10 (i.e., the torque input to the sub transmission 50) is provided in place of the engine output torque sensor 608 in the first embodiment. The operation of the second embodiment will be described hereinunder with reference to the flowcharts (shown in FIGS. 8 and 9) for the transfer shifting process 800 employed in the first embodiment.

Figure 14:
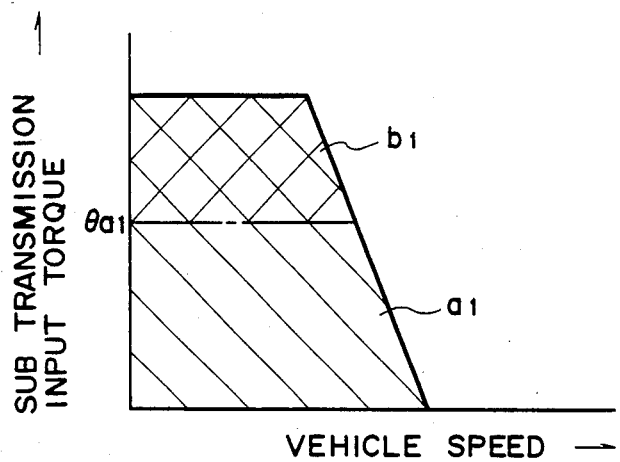
FIGS. 14 and 15 are graphs showing up-shift regions in accordance with the second embodiment of the present invention.

First of all, judgement is made (Step 801) as to whether the outer to the solenoid valve S4 is "1" (representing energization) or "0" (representing de-energization). If "1" is the answer in Step 801, it is judged that the sub transmission 50 is in the reduced-speed mode, and the process proceeds to the L to H control 800B. If "0" is the answer in Step 801, it is judged that the sub transmission 50 is in the direct-coupling mode, and the H to L control 800A is carried out. In this H to L control 800A, judgement is first made (Step 802A) as to whether or not the shift position Sp of the sub transmission 50 is set in the L4 range. If NO, the process returns, whereas if YES is the answer in Step 802A, it is judged that the driver has switched the sub transmission 50 from the direct-couping mode to the reduced-speed mode, and judgement is made (Step 803A) as to whether or not the set time T3 has elasped, the time T3 corresponding to the period of time which starts when the main transmission 10 starts a particular speed change operation and which ends when the speed change operation is completed. If NO, it is judged that the main transmission 10 is in the cource of a speed change operation, and the process returns. If YES is the answer in Step 803A, it is judged that the speed change operation of the main transmission 10 has already been completed, and judgement is made (Step 804A) as to whether or not the shift position Mp is set in the L range. If YES, judgement is made (Step 805A) as to whether or not the set time T11 has elasped, the time T11 corresponding to the period of time which starts when the main transmission 10 is set in the L range and which ends when a relevant speed change operation is completed. If NO, the process returns, whereas YES is the answer in Step 805A, judgement is made (Step 806A) as to whether the second speed shift flag is "0" (the flag is down) or "1" (the flag is up). If "0" is the answer in Step 806A, judgement is made (Step 807A) as to whether or not the gear selected by the main transmission 10 is the first speed gear {i.e., the respective outputs to the solenoids S1, S2=(1, 0)}. If NO, the process returns, wheres if YES is the answer in Step 807A, judgement is made (Step 808A) as to whether or not the vehicle running state is within the region for allowing the solenoid valve S4 to be energized when the shift position Mp is set in the L range and the gear selected by the main transmission 10 is the first speed gear. If YES, judgement is made (Step 809A) as to whether or not the torque $\theta 1$ input to the the sub transmission 50 shown in FIG. 14 is less than a predetermined torque $\theta a1$ (i.e., within the range denoted a1 in FIG. 14). If YES, the input torque to the sub transmission 50 is judged to be relatively small, and judgement is made (Step 810A) as to whether the H and L shift flag is "0" (the flag is down) or "1" (the flag is up). If "0" is the answer in Step 810A, the H to L flag is set ("1") (Step 811A). Then, the computer 600 produces an output which allows the solenoid valve S4 to be energized (Step 812A), and judgement is made (Step 813A) as to whether or not the set time T8 has elasped, the time T8 corresponding to the period of time which starts when the solenoid valve S4 is energized and which ends when the spool 441 of the inhibitor valve 440 starts to move. If YES, judgement is made (Step 814A) as to whether or not the set time T4 (during which no speed change operation of the main transmission 10 is allowed) has elapsed, the time T4 corresponding to the period of time which starts when the solenoid valve S4 is energized and which ends when the shift of the sub transmission 50 to the reduced-speed mode is completed. If YES, the second speed shift flag is reset ("0") (Step 815A), the lock-up inhibition flag is reset ("0") (Step 816A), and the H to L shift flag is reset ("0") (Step 817A), and then, the process returns. If NO is the answer in step 814A (i.e., in the case where the set time T4 has not yet elapsed), the respective outputs to the solenoid valves S1, S2 of the main hydraulic controller 100 are maintained as they are (Step 818A) in order to inhibit any speed change operation of the main transmission 10 during the set time T4. If NO is the answer in Step 813A (i.e., in the case where the set time T8 has not yet elasped), judgement is made (Step 819A) as to whether or not the shift position Sp of the sub transmission 50 is set in the L4 range. If YES, the process proceeds to Step 804A, whereas if NO is the answer in Step 819A, the computer 600 produces an output which allows the solenoid valve S4 to be de-energized (Step 820A), and the process then proceeds to Step 815A. If "1" is the answer in Step 810A (i.e., in the case where the H to L shift flag is up), the process proceeds to Step 813A. If NO is the answer in Step 809A {i.e., in the case where the input torque $\theta 1$ to the sub transmission 50 exceeds the set torque $\theta a1$ (i.e., within the range denoted by b1 in FIG. 14)}, the input torque in the sub transmission 50 is judged to be excessively large, and judgement is made (Step 821A) as to whether the H to L shift flag is "0" or "1". If "0" is the answer (in the case where the flag is down), the second speed shift flag is set ("1") (Step 822A), and the computer 600 produces outputs which respectively allow the solenoid valves S1, S2 to be energized, thereby up-shifting the gear selected by the main transmission 10 from the first speed gear to the second speed gear and thus reducing the torque input to the sub transmission 50 (Step 823A). Then, judgement is made (Step 824A) as to whether or not the set time T7 has elapsed, the time T7 corresponding to the period of time which starts when the up-shift of the main transmission 10 starts due to the input torque $\theta 1$ to the sub transmission 50 exceeding the set torque $\theta a1$ and the solenoid outputs "1", "1" are consequently produced and which period ends when a revelant speed change is completed. If YES, the process proceeds to Step 810A, whereas if NO is the answer in Step 824A, judgement is made (Step 825A) as to whether or not the shift position Sp of the sub transmission 50 is set in the L4 range. If YES, the process proceeds to Step 804A, whereas if NO is the answer in Step 825A, the second speed shift flag is reset ("0") (Step 826A), and the lock-up inhibition flag is reset ("0") (Step 827A), and then the process returns. If "1" is the answer in Step 821A (i.e., in the case where the H to L shift flag is up), the process proceeds to Step 820A. If NO is the answer in Step 808A (i.e., in the case where the vehicle running state is out of the region for allowing the solenoid valve S4 to be energized), judgement is made (Step 828A) as to whether the H to L shift flag is "0" or "1". If "0" is the answer (i.e., in the case where the flag is down), the second speed shift flag is reset ("0") (Step 829A), and the process then returns. If "1" is the answer in Step 828A (i.e., in the case where the second speed shift flag is up), the process proceeds to Step 820A. If "1" is the answer in Step 806A (i.e., in the case where the second speed shift flag is up), judgement is made (Step 830A) as to whether or not the vehicle running state is within the region for allowing the solenoid valve S4 to be energized when the shift position Mp is set in the L range and the gear selected by the main transmission 10 is the first speed gear. If YES, the process proceeds to Step 824A, whereas if NO is the answer in Step 830A, the process proceeds to Step 828A. If NO is the answer in Step 804A (i.e., in the case where the shift position Mp is not set in the L range), judgement is made (Step 831A) as to whether the output to the solenoid valve S3 which effects lock-up control of the main transmission 10 is "1" (representing energization) or "0" (representing de-energization). If "1" is the answer in Step 831A (i.e., in the case where the solenoid valve S3 is in the energized state), the solenoid valve S3 is de-energized (Step 832A), whereas if "0" is the answer in Step 831A (i.e., in the case where the solenoid valve S3 is in the de-energized state), the lock-up inhibition flag is set ("1") (Step 833A). Then, judgement is made (Step 833A) as to whether or not the set time T6 has elapsed, the time T6 corresponding to the period of time which starts when the solenoid valve S3 is de-energized and which ends when the direct clutch 16 is disengaged. If NO, the process returns, whereas if YES is the answer in Step 834A, judgement is made (Step 835A) as to whether or not the shift position Mp of the main transmission 10 is set in the S range. If YES, judgement is made (Step 836A) as to whether or not the set time T11 has elapsed, the time T11 corresponding to the period of time which starts when the shift position Mp of the main transmission 10 is set in the S range and which ends when a relevant speed change operation is completed. If NO, the process returns, whereas if YES is the answer in Step 836A, judgement is made (Step 837A) as to whether the second speed shift flag is "0" or "1". If "0" is the answer (i.e., in the case where the flag is down), judgement is made (Step 838A) as to whether the output to the solenoid valve S1 is "1" (representing energization) or "0" (representing de-energization). If "0" is the answer (i.e., in the case where the valve S1 is in the de-energized state), it is judged that the gear selected by the main transmission is the third speed gear, and the process then returns. If "1" is the answer (i.e., the valve S1 is in the energized state), judgement is made (Step 839A) as to whether the output to the solenoid valve S2 is "1" (representing energization) or "0" (representing de-energization). If "0" is the answer (i.e., in the case where the valve S2 is in the de-energized state), it is judged that the gear selected by the main transmission 10 is the first speed gear, and judgement is made (Step 840A) as to whether or not the vehicle running state is within the region for allowing the solenoid valve S4 to be energized when the shift position Mp is set in the S range and the gear selected by the main transmission 10 is the first speed gear. If YES, the process proceeds to Step 809A, whereas if NO is the answer in Step 840A, the process proceeds to Step 828A. If "1" is the answer in Step 839A (i.e., in the case where the solenoid valve S2 is in the energized state), it is judged that the gear selected by the main transmission 10 is the second speed gear, and judgement is made (Step 841A) as to whether or not the vehicle running state is within the region for allowing the solenoid valve S4 to be energized when the shift position Mp is set in the S range and the gear selected by the main transmission 10 is the second speed gear. If YES, the process proceeds to Step 810A, whereas if NO is the answer in Step 841A, the process proceeds to Step 828A. If "1" is the answer in Step 837A (i.e., in the case where the second speed shift flag is up), judgement is made (Step 842A) as to whether or not the vehicle running state is within the region for allowing the solenoid valve S4 to be energized when the shift position Mp is set in the S range and the gear selected by the main transmission 10 is the first speed gear. If YES, the process proceeds to Step 824A, whereas if NO is the answer in Step 842A, the process proceeds to Step 828A. If NO is the answer in Step 835A (i.e., in the case where the shift position Mp is not set in the S range), judgement is made (Step 843A) as to whether or not the time T11 has elapsed, the time T11 corresponding to the period of time which starts when the shift position Mp of the main transmission 10 is changed and which ends when a relevant speed change operation is completed. If NO, the process returns, whereas if YES is the answer in Step 843A, judgement is made (Step 844A) as to whether the second speed shift flag is "0" or "1". If "0" is the answer (i.e., in the case where the flag is down), judgement is made (Step 845A) as to whether the output to the solenoid valve S1 is "1" (representing energization) or "0"(representing de-energization). If "1" is the answer (i.e., in the case where the solenoid valve S1 is in the energized state), judgement is made (Step 846A) as to whether the output to the solenoid valve S2 is "1" (representing energization) or "0" (representing de-energization). If "0" is the answer (i.e., in the case where the valve S2 is in the de-energized state), it is judged that the gear selected by the main transmission 10 is the first speed gear, and judgement is made (Step 847A) as to whether or not the vehicle running state is within the region for allowing the solenoid valve S4 to be energized when the shift position Mp is set in the D range and the gear selected by the main transmission 10 is the first speed gear. If YES, the process proceeds to Step 809A, whereas if NO is the answer in Step 847A, the process proceeds to Step 828A. If "1" is the answer in Step 846A (i.e., in the case where the solenoid valve S2 is in the energized state), it is judged that the gear selected by the main transmission 10 is the second speed gear, the judgement is made (Step 848A) as to whether or not the vehicle running state is within the region for allowing the solenoid valve S4 to be energized when the shift position Mp is set in the D range and the gear selected by the main transmission 10 is the second speed gear. If YES, the process proceeds to Step 810A, whereas if NO is the answer in Step 848A, the process proceeds to Step 828A. If "0" is the answer in Step 845A (i.e., in the case where the solenoid valve S1 is in the de-energized state), judgement is made (Step 849A) as to whether the output to the solenoid valve S2 is "1" (representing energization) or "0" (representing de-energization). If "1" is the answer (i.e., in the case where the solenoid valve S2 is in the energized state), it is judged that the gear selected by the main transmission 10 is the third speed gear, and judgement is made (Step 850A) as to whether or not the vehicle running state is within the region for allowing the solenoid valve S4 to be energized when the shift position Mp is set in the D range and the gear selected by the main transmission 10 is the third speed gear. If YES, the process proceeds to Step 810A, whereas if NO is the answer, the process proceeds to Step 828A. If "0" is the answer in Step 849A (i.e., in the case where the solenoid valve S2 is in the de-energized state), it is judged that the gear selected by the main transmission 10 is the fourth speed gear, and the process then proceeds to Step 828A. If "1" is the answer in the Step 844A (i.e., in the case where the second speed shift flag is up), judgement is made (Step 851A) as to whether or not the vehicle running state is within the region for allowing the solenoid valve S4 to be energized when the shift position Mp is set in the D range and the gear selected by the main transmission 10 is the first speed gear. If YES, the process proceeds to Step 824A, whereas if NO is the answer in Step 851A, the process proceeds to Step 828A.

FIG. 9 is a flowchart showing the control for shifting the sub transmission 50 from the reduced-speed mode to the direct-coupling mode (hereinafter referred to as "L to H") in accordance with the transfer shifting process 800.

Figure 15:
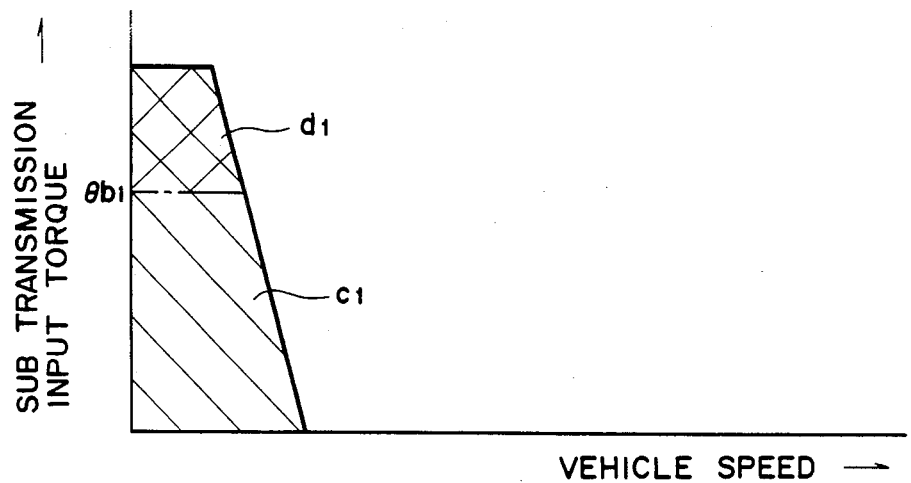

First of all, judgement is made (Step 801) as to whether the output to the solenoid valve S4 is "1" (representing energization) or "0" (representing de-energization). If "0" is the answer, it is judged that the sub transmission 50 is set in the direct-coupling mode, and the process proceeds to the H to L control 800A, whereas if "1" is the answer, it is judged that the sub transmission 50 is set in the reduced-speed mode, and the L to H control 800B is carried out. In this control 800B, judgement is first made (Step 802B) as to whether or not the shift position Sp of the sub transmission 50 is set in the L4 range. If YES, the process returns, whereas if NO is the answer, it is judged that the driver has switched the sub transmission 50 from the reduced-speed mode to the direct-coupling mode, and judgement is made (Step 803B) as to whether or not a set time T3 has elapsed, the time T3 corresponding to the period of time which starts when the main transmission 10 starts a particular speed change operation and which ends when the operation is completed. If NO, it is judged that the main transmission 10 is in the course of a speed change operation, and the process returns. If YES is the answer in Step 803B (i.e., in the case where the set time T3 has already elapsed), it is judged that the speed change operation of the main transmission 10 has already completed, and judgement is made (Step 804B) as to whether or not the shft position Mp of the main transmission 10 is set in the L range. If YES, judgement is made (Step 805B) as to whether or not the set time 11 has elapsed, the time T11 corresponding to the period of time which starts when the main transmission 10 is set in the L range and which ends when a relevant speed change operation is completed. If NO, the process returns, whereas If YES is the answer in Step 805B, judgement is made (Step 806B) as to whether the second speed shift flag is "0" (the flag is down) or "1" (the flag is up). If "0" is the answer, judgement is made (Step 807B) as to whether or not the gear selected by the main transmission 10 is the first speed gear {the respective outputs to the solenoids S1, S2=(1,0)}. If YES, judgement is made (Step 808B) as the whether or not the vehicle running state is within the region for allowing the solenoid valve S4 to be de-energized when the shift position Mp is set in the L range and the gear selected by the main transmission 10 is the first speed gear. If YES, judgement is made (Step 809B) as to whether or not the torque $\theta 1$ input to the sub transmission 50 shown in FIG. 15 is less than a predetermined torque $\theta b1$ (i.e., within the range denoted by c1 in FIG. 15). If YES, it is judged that the input torque to the sub transmission 50 is judged to be relatively small, and judgement is made (Step 810B) as to whether the L to H shift flag is "0" (the flag is down) or "1" (the flag is up). If "0" is the answer (i.e., in the case where the flag is down), the L to H shfit flag is set ("1") (Step 811B). Then, the computer 600 produces an output which allows the solenoid valve S4 to be de-energized (Step 812B), and judgement is made (Step 813B) as to whether or not the set time T9 has elapsed, the time T9 corresponding to the period of time which starts when the solenoid valve S4 is de-energized and which ends when the spool 441 of the inhibitor valve 440 starts to move. If YES (in the case where the set time T9 has already elapsed), judgement is made (Step 814B) as to whether or not a set time T5 (during which no speed change operation of the main transmission 10 is allowed) has elapsed, the time T5 corresponding to the period of time which starts when the solenoid valve S4 is de-energized and which ends when the sub transmission 50 has been shifted to the direct-coupling mode. If YES, the second speed shift flag is reset ("0") (Step 815B), the lock-up inhibition flag is reset ("0") (Step 816B), and the L to H shift flag is reset ("0") (Step 817B), and then, the process returns. If NO is the answer in Step 814B (i.e., in the case where the set time T5 has not yet elapsed), the respective outputs to the solenoid valves S1, S2 of the main hydraulic controller 100 are maintained as they are (Step 818B) in order to inhibit any speed change operation of the main transmission 10 during the set time T5. If NO is the answer in Step 813B (i.e., in the case where the set time T8 has not yet elapsed), judgement is made (Step 819B) as to whether or not the shift position Sp of the sub transmission 50 is set in the L4 range. If NO, the process proceeds to Step 804B, whereas if YES is the answer, the computer 600 produces an output which allows the solenoid valve S4 to be energized (Step 820B), and the process proceeds to Step 815B. If "1" is the answer in Step 810B, (i.e., the L to H shift flag is up), the process proceeds to Step 813B. If NO is the answer in Step 809B {i.e., in the case where the input torque $\theta 1$ to the sub transmission 50 exceeds the set torque $\theta b1$ (i.e., within the range denoted by d1 in FIG. 15){, it is judged that the input torque to the sub transmission 50 is judged to be excessively large, and judgement is made (Step 821B) as to whether the L to H shift flag is "0" or "1". If "0" (in the case where the flag is down), the second speed shift flag is set ("1") (Step 822B), and the computer 600 produces outputs which respectively allow the solenoid valves S1, S2 to be energized, thereby up-shifting the main transmission 10 from the first speed gear to the second speed gear and thus reducing the input torque to the sub transmission 50 (Step 823B). Then, judgement is made (Step 824B) as to whether or not a set time T10 has elasped, the time T10 corresponding to the period of time which starts when the up-shift of the main transmission 10 starts due to the input torque $\theta 1$ to the sub transmission 50 exceeding the set torque $\theta b1$ and the solenoid ouputs "1", "1" are consequently produced and which period ends when a relevant speed change operation is completed. If YES (in the case where the set time T10 has already elapsed), the process proceeds to Step 810B, whereas if NO is the answer in Step 824B, judgement is made (Step 825B) as to whether or not the shift position Sp of the sub transmission 50 is set in the L4 range. If NO, the process proceeds to Step 804B, whereas if YES is the answer, the second speed shift flag is reset ("0") (Step 826B), and the lock-up inhibition flag is reset ("0") (Step 827B), and then, the process returns. If "1" is the answer in Step 821B (i.e., in the case where the L to H shift flag is up), the process proceeds to Step 820B. If NO is the answer in Step 808B (i.e., in the case where the vehicle running state is out of the region for allowing the solenoid valve S4 to be de-energized), judgement is made (Step 828B) as to whether the L to H shift flag is "0" or "1". If "0" (in the case where the flag is down), the second speed shift flag is reset ("0") (Step 829B), and the process then returns. If "1" is the answer (in the case where the second speed shift falg is up), the process proceeds to Step 820B. If NO is the answer in Step 807B (i.e., in the case where the gear selected by the main transmission 10 is not the first speed gear), it is judged that the gear selected by the main transmission 10 is the second speed gear, and judgement is made (Step 830B) as to whether or not the vehicle running state is within the region for allowing the solenoid valve S4 to be de-energized when the shift position Mp is set in the L range. If YES, the process proceeds to Step 810B, whereas if NO is the answer, the process proceeds to Step 828B. If "1" is the answer in Step 806B (i.e., in the case where the second speed shift flag is up), judgement is made (Step 831B) as to whether or not the vehicle running state is within the region for allowing the solenoid valve S4 to be de-energized when the shift position Mp is set in the L range and the gear selected by the main transmission 10 is the first speed gear. If YES, the process proceeds to Step 824B, whereas if NO is the answer, the process proceeds to Step 828B. If NO is the answer in Step 804B (i.e., in the case where the shift position Mp is not set in the L range), judgement is made (Step 832B) as to whether the output to the solenoid valve S3 which effects lock-up control of the main transmission 10 is "1" (representing energization) or "0" (representing de-energization). If "1" is the answer (in the case where the valve S3 is in the energized state), the valve S3 is de-energized (Step 833B), whereas if "0" is the answer (in the case where the valve S3 is in the de-energized state), the lock-up inhibition flag is set ("1") (Step 834B). Then, judgement is made (Step 835B) as to whether or not the time T6 has elapsed, the time T6 corresponding to the period of time which starts when the solenoid valve S3 is de-energized and which ends when the direct clutch 16 is disengaged. If NO (in the case where the time T6 has not yet elapsed), the process returns, whereas if YES is the answer in Step 835B, judgement is made (Step 836B) as to whether or not the shift position Mp of the main transmission 10 is set in the S range. If YES, judgement is made (Step 837B) as to whether or not the set time T11 has elapsed, the time T11 corresponding to the period of time which starts when the main transmission 10 is set in the S range and which ends when a relevant speed change operation is completed. If NO, the process returns, whereas if YES is the answer, judgement is made (Step 838B) as to whether the second speed shift flag is "0" or "1". If "0" is the answer (in the case where the flag is down), judgement is made (Step 839B) as to whether the output to the solenoid valve S1 is "1" (representing energization) or "0" (representing de-energization). If "1" is the answer (i.e., in the case where the valve S1 is in the energized state), judgement is made (Step 840B) as to whether the output to the solenoid valve S2 is "1" (representing energization) or "0" (representing de-energization). If "0" is the answer (in the case where the valve S2 is in the de-energized state), it is judged that the gear selected by the main transmission 10 is the first speed gear, and judgement is made (Step 841B) as to whether or not the vehicle running state is within the region for allowing the solenoid valve S4 to be de-energized when the shift position Mp is set in the S range and the gear selected by the main transmission 10 is the first speed gear. If YES, the process proceeds to Step 809B, whereas if NO is the answer, the process proceeds to Step 828B. If "1" is the answer in Step 840B (i.e., in the case where the solenoid valve S2 is in the energized state), it is judged that the gear selected by the main transmission 10 is the second speed gear, and judgement is made (Step 842B) as to whether or not the vehicle running state is within the region for allowing the solenoid valve S4 to be de-energized when the shift position Mp is set in the S range and the gear selected by the main transmission 10 is the second speed gear. If YES, the process proceeds to Step 810B, whereas if NO is the answer in Step 842B, the process proceeds to Step 828B. If "0" is the answer in Step 839B (i.e., in the case where the solenoid valve S1 is in the de-energized state), it is judged that the gear selected by the main transmission 10 is the third speed gear, and judgement is made (Step 843B) as to whether or not the vehicle running state is within the region for allowing the solenoid valve S4 to be de-energized when the shift position Mp is set in the S range and the gear selected by the main transmission 10 is the third speed gear. If YES, the process proceeds to Step 810B, whereas if NO is the answer in Step 843B, the process proceeds to Step 828B. If "1" is the answer in Step 837B (i.e., in the case where the second speed shift flag is up), judgement is made (Step 844B) as to whether or not the vehicle running state is within the region for allowing the solenoid valve S4 to be de-energized when the shift position Mp is set in the S range and the gear selected by the main transmission 10 is the first speed gear. If YES, the process proceeds to Step 824B, whereas if NO is the answer in Step 844B, the process proceeds to Step 828B. If NO is the answer in Step 836B (i.e., in the case where the shift position Mp is not set in the S range), judgement is made (Step 845B) as to whether or not the set time T11 has elapsed, the time T11 corresponding to the period of time which starts when the shift position Mp of the main transmission 10 is changed and which ends when a relevant speed change operation is completed. If NO, the process returns, whereas if YES is the answer in Step 845B, judgement is made (Step 846B) as to whether the second speed shift flag is "0" or "1". If "0" is the answer (in the case where the flag is down), judgement is made (Step 847B) as to whether the output to the solenoid valve S1 is "1" (energization) or "0" (de-energization). If "1" is the answer (i.e., in the case where the solenoid valve S1 is in the energized state), judgement is made (Step 848B) as to whether the output to the solenoid valve S2 is "1". (energization) or "0" (de-energization). If "0" is the answer (i.e., in the case where the solenoid valve S2 is in the de-energized state), it is judged that the gear selected by the main transmission 10 is the first speed gear, and judgement is made (Step 849B) as to whether or not the vehicle running state is within the region for allowing the solenoid valve S4 to be de-energized when the shift position Mp is set in the D range and the gear selected by the main transmission 10 is the first speed gear. If YES, the process proceeds to Step 809B, whereas if NO is the answer in Step 849B, the process proceeds to Step 828B. If "1" is the answer in Step 848B (i.e., in the case where the solenoid valve S2 is in the energized state), it is judged that the gear selected by the main transmission 10 is the second speed gear, and judgement is made (Step 850B) as to whether or not the vehicle running state is within the region for allowing the solenoid valve S4 to be de-energized when the shift position Mp is set in the D range and the gear selected by the main transmission 10 is the second speed gear. If YES, the process proceeds to Step 810B, whereas NO is the answer in Step 850B, the process proceeds to Step 828B. If "0" is the answer in Step 847B (i.e., in the case where the solenoid valve S1 is in the de-energized state), judgement is made (Step 851B) as to whether the output to the solenoid valve S2 is "1" (energization) or "0" (de-energization). If "1" is the answer in Step 851B (i.e., in the case where the solenoid valve S2 is in the energized state), it is judged that the gear selected by the main transmission 10 is the third speed gear, and judgement is made (Step 852B) as to whether or not the vehicle running state is within the region for allowing the solenoid valve S4 to be de-energized when the shift position Mp is set in the D range and the gear selected by the main transmission 10 is the third speed gear. If YES, the process proceeds to Step 810B, whereas if NO is the answer in Step 852B, the process proceeds to Step 828B. If "0" is the answer in Step 851B (i.e., in the case where the solenoid valve S2 is in the de-energized state), it is judged that the gear selected by the main transmission 10 is the fourth speed gear, and the process proceeds to Step 828B. If "1" is the answer in Step 846B (i.e., in the case where the second speed shift flag is up), judgement is made (Step 853B) as to whether or not the vehicle running state is within the region for allowing the solenoid valve S4 to be de-energized when the shift position Mp is set in the D range and the gear selected by the main transmission 10 is the first speed gear. If YES, the process proceeds to Step 824B, whereas if NO is the answer in Step 853B, the process proceeds to Step 828B.

Although the invention has been described through its preferred forms, it is to be understood that the described embodiments are only illustrative and various changes and modifications may be imparted thereto.

For instance, the planetary gear type speed change gears in the main transmission of the described embodiments may be substituted by other types of speed changing mechanism which operate under the control of an electronic controller, e.g., a speed change gear incorporating a plurality of meshing gear trains selectable by a solenoid clutch, a stepless speed change gear operable by a fluid-type actuator, and so forth.

The sub transmission can employ an automatic speed change gear which operates under the control of a suitable control means, e.g., a stepless speed change gear incorporating a plurality of meshing gear trains, although the sub transmission in the described embodiments employs a planetary gear type speed change gear which provides two speed modes, i.e., the direct-coupling drive mode and the reduced-speed drive mode.

Although in the described embodiments the input torque sensor means is adapted to detect both the engine output torque and the output torque of the main transmission and thereby to detect the torque input to the sub transmission, a throttle opening sensor means may be applied to the input torque sensor means, since the engine output torque is increased in proportion to the increase in the throttle opening of the engine.

It is to be understood also that the described four-wheel drive transfer employing the sub transmission for transmitting power to front wheels and rear wheels is only illustrative and the invention can apply equally well to any type of transmission system which has a main transmission and a sub transmission.

What we claim is:

1. A transmission control device which controls the operation of a transmission system which includes a main transmission and a sub transmission, comprising:
a control means which effects a change-over of the main transmission between different speed gears in accordance with a level of the torque output from an engine when speed modes of the sub transmission are changed over, and wherein the gear selected by the main transmission is shifted up when the level of the torque input to the sub transmission is greater than a predetermined value.

2. A transmission control device according to claim 1, wherein the level of the torque output from said engine is detected by main transmission input torque sensor means.

3. A transmission control device according to claim 1, wherein the level of the torque output from said engine is detected by detecting the level of the torque input to said sub transmission.

4. A transmission control device for controlling a transmission system which comprises a main transmission and a sub transmission connected to an output shaft of the main transmission and having a plurality of speed changing ratios, comprising:
an electronic controller means, upon detection of signals from various sensor means for sensing the running state of a vehicle, for judging a speed changing ratio and for generating signals for controlling speed changing mechanisms of the main and sub transmissions; and
speed changing mechanism driving means for controlling speed changing ratios by driving the speed changing mechanisms by means of the control signals from the electronic controller means, wherein the electronic controller means has:
(a) means for establishing a speed changing range in response to vehicle speed and output torque of the engine, wherein the means for establishing the speed changing range uses the input torque of the subtransmission as the output torque of the engine; and
(b) means for generating a control signal for upshifting the speed changing ratio of the main transmission if the output torque of the engine in a speed changing range is greater than a predetermined value.

5. A transmission control device according to claim 4, wherein the speed changing mechanism driving means comprises:
(a) a main hydraulic control means having a solenoid valve for changing the speed changing ratio of the main transmission by selectively engaging and disengaging frictional engagement elements in accordance with energization and de-energization of the solenoid valve, and
(b) a sub hydraulic control means having a solenoid valve for changing the speed changing ratio of the sub transmission by selectively engaging and disengaging the frictional engagement elements in accordance with the energization and de-energization of the solenoid valve.

6. A transmission control device according to claim 4, wherein the means for establishing the speed changing range uses the input torque of the main transmission as the output torque of the engine.

7. A transmission control device according to claim 4, wherein the means for establishing the speed changing range uses throttle opening as the output torque of the engine.

8. A transmission control device according to claim 4, wherein the main transmission has a manual change-over valve, and wherein the means for establishing the speed changing range provides the speed changing range in accordance with the position of the manual change-over valve.

9. A transmission control device according to claim 4, wherein the speed changing range is a first speed range.

10. A transmission control device according to claim 4, wherein the means for generating the control signal is also for judging whether or not the sub transmission is in a transient speed change period and for inhibiting a change-over of the main transmission during the transient speed change period.

11. A transmission control device according to claim 10, wherein the means for generating the control signal is also for providing a moment at which a speed changing operation is commenced and a period required until completion of the speed changing operation on the basis of the operational characteristics of a change-over of energization and de-energization of the solenoid valve and the operational characteristics of a hydraulic circuit element, and for judging the transient speed change period on whether or not a predetermined time has lapsed from the start of the speed changing operation.

12. A transmission control device according to claim 10, wherein the means for generating the control signal is also for providing a moment at which a speed changing operation is commenced and a period required for completion of the speed changing operation on the basis of a change-over of a position of the manual change-over valve and operational characteristics of hydraulic circuit element, and for judging transient speed change period on whether or not a predetermined time has lapsed from the start of the speed changing operation.

* * * * *